US012163650B2

(12) United States Patent
Rutherford

(10) Patent No.: US 12,163,650 B2
(45) Date of Patent: Dec. 10, 2024

(54) INTEGRATED LIGHTING AND POWER FOR CABINETRY AND CONNECTORS FOR SAME

(71) Applicant: Sensio America, LLC, Carol Stream, IL (US)

(72) Inventor: Gary B. Rutherford, Wheaton, IL (US)

(73) Assignee: SENSIO AMERICA, LLC, Carol Stream, IL (US)

( * ) Notice: Subject to any disclaimer, the term of this patent is extended or adjusted under 35 U.S.C. 154(b) by 0 days.

(21) Appl. No.: 18/074,409

(22) Filed: Dec. 2, 2022

(65) Prior Publication Data

US 2023/0175679 A1 Jun. 8, 2023

Related U.S. Application Data

(60) Provisional application No. 63/285,482, filed on Dec. 2, 2021.

(51) Int. Cl.
*F21V 23/06* (2006.01)
*F21S 4/28* (2016.01)
(Continued)

(52) U.S. Cl.
CPC ................ *F21V 23/06* (2013.01); *F21S 4/28* (2016.01); *F21V 23/008* (2013.01); *F21W 2131/301* (2013.01); *F21Y 2103/10* (2016.08)

(58) Field of Classification Search
CPC ..... A47B 2220/0075–0077; F21S 4/28; F21V 23/003–06; F21V 33/0012; F21W 2131/301; F21Y 2115/10
See application file for complete search history.

(56) References Cited

U.S. PATENT DOCUMENTS 5,903,993 A 5/1999 Maticko et al.
9,374,856 B2 6/2016 Winton
(Continued)

FOREIGN PATENT DOCUMENTS

CN 202302954 U 7/2012
CN 204678170 U 9/2015
WO 2021007449 A1 1/2021

OTHER PUBLICATIONS

International Preliminary Report on Patentability cited in corresponding international patent application No. PCT/ US2022/ 051741; May 2, 2024; 7 pp.
(Continued)

*Primary Examiner* — Jason M Han
(74) *Attorney, Agent, or Firm* — Lempia Summerfield Katz LLC

(57) ABSTRACT

A cabinet system with integrated lighting and power includes a first illumination zone associated with a cabinet, a first connector, a first light strip, and a driver. The first connector has a first port defining a first axis and a second through port with open opposite ends and defining a second axis orthogonal to the first axis. The first light strip has an elongate substrate with a first end, a second end, a plurality of illumination elements along the length of the substrate, and multiple traces extending lengthwise along the substrate. The traces include a positive and a negative power trace, a first trace connected to the illumination elements, and a second trace not connected to the illumination elements. The first end is configured to be received in any one of the first port or the opposite ends of the second through port. The driver is coupled to a power source and has a lead with a slide connector configured to slide onto the first light strip. The illumination elements are selectively controlled by controlling power to the positive and negative power traces
(Continued)

and the first trace to selectively illuminate the first illumination zone.

13 Claims, 11 Drawing Sheets

(51) Int. Cl.

| | |
|---|---|
| ***F21V 23/00*** | (2015.01) |
| ***F21W 131/301*** | (2006.01) |
| ***F21Y 103/10*** | (2016.01) |

(56) References Cited

U.S. PATENT DOCUMENTS

| | | | | |
|---|---|---|---|---|
| 10,851,988 | B2 | 12/2020 | Rutherford | |
| 11,747,005 | B2 | 9/2023 | Rutherford | |
| 2008/0112161 | A1 | 5/2008 | Summers et al. | |
| 2008/0151535 | A1 | 6/2008 | De | |
| 2009/0073693 | A1 | 3/2009 | Nall | |
| 2010/0008090 | A1 | 1/2010 | Li et al. | |
| 2011/0285314 | A1 | 11/2011 | Carney | |
| 2013/0016500 | A1 | 1/2013 | Tress | |
| 2014/0334142 | A1 | 11/2014 | Levante et al. | |
| 2014/0362574 | A1 | 12/2014 | Barrett | |
| 2015/0241035 | A1 | 8/2015 | Dankelmann et al. | |
| 2018/0283668 | A1* | 10/2018 | Conrady | A47B 77/08 |
| 2018/0306422 | A1 | 10/2018 | Carney et al. | |
| 2019/0154241 | A1 | 5/2019 | Danville et al. | |
| 2020/0248880 | A1 | 8/2020 | Hamer | |
| 2021/0088208 | A1 | 3/2021 | Hou et al. | |
| 2023/0408078 | A1 | 12/2023 | Rutherford | |

OTHER PUBLICATIONS

International Preliminary Report on Patentability cited in the international PCT app No. PCT/US2020/041434; Jan. 11, 2022; 11 pp.

International Search Report and Written Opinion cited in corresponding international patent application No. PCT/ US2022/ 051741; May 9, 2023; 11pp.

International Search Report and Written Opinion cited in corresponding PCT app No. PCT/US2020/041434; Nov. 23, 2020; 15 pp.

Office Action cited in Canadian patent application No. 3, 146,578; Mar. 27, 2024; 4 pp.

Office Action cited in Chinese patent application No. 202080063185.4; Mar. 13, 2024; 39 pp.

* cited by examiner

INTEGRATED LIGHTING AND POWER FOR CABINETRY AND CONNECTORS FOR SAME

RELATED APPLICATION DATA

This patent claims priority to and the benefit of prior filed U.S. Provisional Application Ser. No. 63/285,482 filed Dec. 2, 2021 and titled "INTEGRATED LIGHTING AND POWER FOR CABINETRY AND CONNECTORS FOR SAME." The entire contents of this prior filed application are incorporated herein by reference in their entirety by this reference.

BACKGROUND

1. Field of the Disclosure

This disclosure is generally related to power delivery and lighting for storage cabinets, and more particularly to an integrated power and lighting system and solution for cabinetry including various connectors for joining the system components

2. Description of Related Art

It is becoming common to incorporate lighting and lighting features into storage cabinets and cabinet systems when such cabinet systems are installed. For example, new kitchen designs often incorporate multiple zone cabinet lighting solutions among the cabinetry. Such cabinet systems can include wall cabinets with an under-cabinet zoned lighting. This type of lighting can be provided for utility to illuminate the countertop and appliance work surfaces beneath the wall cabinets. Such cabinet systems can also include interior cabinet and drawer lighting. Interior lighting can provide utility to illuminate drawers and solid door cabinets when opened. This type of lighting can aid users in seeing the contents of such spaces. Zoned lighting can also be provided for aesthetics to illuminate wall and other cabinets with glass panels in the cabinet doors. This type of lighting can be employed to more softly illuminate the cabinet interiors and to highlight visible objects stored within such glass front cabinets. Such cabinet systems can also include upper soffit zoned lighting for illuminating areas above the tops of the wall cabinets. This type of lighting can be provided for soft or adjustable general illumination for a space that contains the cabinets.

The components of these lighting features are typically installed on site, once the cabinets are delivered, and during and/or after the cabinets are installed at the site. No matter the cabinet system or installation, the method of installing such lighting features or solutions is tedious, time consuming, and often complicated. This generally requires physical modification of the cabinets, such as drilling holes and the like. Further, the wiring that is required to accommodate cabinet lighting features typically includes a separate power connection to a power source for each different zone of the lighting arrangement. Power for each lighting zone must be connected both to the dedicated site power source and to the illumination elements or lights of each zone one each cabinet, such as the different lighting strips. A separate power cord is thus typically run from the lights in each zone on each cabinet to the power source. Light emitting diode (LED) lights, and particularly flexible LED lighting strips, are commonly used for lighting features and solutions for cabinet systems. Each zone or application noted above might require a different type of light source (bright task light, soft accent light, warm white or cool white light, colored light, etc.) to provide the specific desired light characteristics of a particular zone or application.

As an example, it is often unsightly and always labor intensive to link the multiple light strips in each cabinet together (i.e., a left interior strip to a right interior strip), and then in series from cabinet to cabinet. This is due to the number of connections that need to be made and all while working within relatively difficult to access and confining work areas. Thus, most installers will have four (4) power cords for four zoned lights within a cabinet instead of linking cabinets. Creating internal links to aggregate the different lighting zones with existing lighting technology, prior to connecting to a power source, increases the number of connections in series. Adding all of those field connections increases resistance on the series, potentially leading to voltage drop and inconsistent lighting levels. Field installed link connections can be prone to faults. Also, inconsistent skill levels among lighting installers can be another factor in success when installing a lighting system. The effort to install links is rarely justified, if you can hide the home run wires.

It is common to arrange a lighting system such that each zone is separately controlled for independent dimming and/or independent ON/OFF control. To achieve this, power is connected to the lighting features by plugging in or hard wiring a separate power supply for each zone to the on-site power source, such as a 120V AC system. Adapters may be utilized along the system to drop voltage to accommodate the low voltage lighting strips. Each power supply is connected to a controller of some type for the corresponding lighting feature or lights for that specific zone. In some cases, one or more of the zoned lighting features are intended to be a switched system and may be capable of being switched independent of any other zone. A switched wall socket may be provided at the site and each respective power supply may be plugged into a switched socket. In other cases, one or more wall switches to operate the lights may be installed on site. The wall switches are then hard wired to the electrical power source at the site and hard wired either to the respective controller for the lights or directly to the wiring for the lights for each switched zone. The different types of lighting features or zones noted above are each connected to a separate electrical power source, switch, controller, or the like for independent control of each type of lighting. This can further complicate the on-site installation of the lighting systems and can drive up cost.

In each system, there is an element that provides power. That power supply may or may not be attached directly to the lights. Controls can be implemented before the power supply, as in the case of dimmable LED drivers that could be used with a standard wall dimmer switch. Controls can also be implemented after the power supply. In such a case, the power from the drivers can go to the lighting controls first, which stand between the power source and the lights.

During a conventional installation of an illuminated cabinet system, the installer must prepare the lights for each cabinet, which may include cutting each LED strip to the appropriate length. The installer must also attach or install each light strip or element in the desired location for each cabinet, whether on top, within, or under each cabinet. The installer must also drill holes in the cabinets where wiring will run between adjacent cabinets to connect lights of one particular feature on each cabinet to one another. The installer must also cut, trim, and run or route all of the wiring for each light strip or feature and then must connect all the wiring to the power source and to the appropriate light strips or features. If the installer has two or three types or zones of lighting features, such as the under cabinet, interior cabinet, or above cabinet lighting, to install on multiple cabinets, the installer must measure for and drill holes for each feature, install the lights for each feature, prepare, run, and connect all of the wiring for each feature, and separately connect the power to each feature. These tasks can be difficult, complex, and time consuming when performed on site during cabinet installation.

SUMMARY

In one example, according to the teachings of the present disclosure, a cabinet system with integrated lighting and power includes a first illumination zone associated with a cabinet, a first connector, a first light strip, and a driver. The first connector has a first port defining a first axis and has a second through port with open ends opposite one another and defining a second axis, wherein the first axis and second axis are arranged generally orthogonal to one another. The first light strip has an elongate substrate with a first end, a second end, a plurality of illumination elements spaced apart along the substrate, and multiple traces extending lengthwise along the substrate. The multiple traces include a positive power trace, a negative power trace, a first trace connected to the plurality of illumination elements, and a second trace not connected to the plurality of illumination elements. The first end is configured to be received in any one of the first port or one of the open ends of the second through port of the first connector. The driver is coupled to a power source and has a lead with a slide connector configured to slide onto the first light strip. The illumination elements of the first light strip are selectively controlled by controlling power to the positive and negative power traces and the first trace to illuminate the first illumination zone.

In one example, the elongate substrate of the first light strip can be a printed circuit board (PCB) substrate that is substantially rigid.

In one example, the cabinet system can include a power pass strip having an elongate substrate with a first end, a second end, and multiple traces extending lengthwise along the substrate. The multiple traces can include a positive power trace, a negative power trace, a first trace, and a second trace. The power pass strip can be configured to pass power along the length of the power pass strip.

In one example, the cabinet system can include a plurality of additional connectors having the same construction as the first connector.

In one example, the second end of the first light strip can be configured to be received in any one of the first port or the opposite ends of the second through port.

In one example, the first connector can include a stem part defining the first port and a head portion defining the second through port.

In one example, the first port and the stem part can be oriented defining a first plane that is parallel to the first axis. The head part and the second through port can be oriented defining a second plane that is parallel to the second axis.

In one example, a first plane and a second plane of the first connector can be neither perpendicular nor parallel with one another.

In one example, a first plane and a second plane of the first connector can be oriented about 45 degrees relative to one another.

In one example, the cabinet system can include a wire link including a link slide connector at each end of a wire set. Each of the link slide connectors can be configured to selectively slide onto the first light strip when mounted to the cabinet and configured to selectively slide onto a second light strip when mounted to an adjacent cabinet. To link cabinets lighting zones and power among the cabinet and the adjacent cabinet, one of the link slide connectors can be connected to each of the first and second light strips.

In one example, the first port can be a blind channel formed in a body of the first connector. The second through port can be a through channel in the body of the first connector between the opposite ends of the second through port.

In one example, the cabinet system can include a second illumination zone and a second light strip. The second light strip can have an elongate substrate with a first end, a second end, a plurality of illumination elements spaced apart along the substrate, and multiple traces extending lengthwise along the substrate. The multiple traces can include a positive power trace, a negative power trace, a first trace not connected to the plurality of illumination elements, and a second trace connected to the plurality of illumination elements. The first end can be configured to be received in any one of the first port or the opposite ends of the second through port of the first connector not occupied by the first light strip and to be received in any one of a first port or opposite ends of a second through port of a second connector having the same construction as the first connector. The illumination elements of the second light strip can be selectively controlled by controlling power to the positive power trace, the negative power trace, and the second trace to illuminate the second illumination zone.

In one example, the second end of the first light strip ca be received in another of the first, second, or third ports of the second connector. Power from the power source can be distributed from the first connector along the first light strip to the second connector and to the second light strip.

In one example, according to the teachings of the present disclosure, a connector for an integrated light and power system for cabinets includes a body, a first port, and a second through port. The body has a stem part defining a first axis and a head part integrally carried on a proximal end of the stem part and defining a second axis oriented orthogonal to the first axis. The first port is disposed in a distal end of the stem part and has a depth into the body, N number of electrical contacts across the first port, and an opening at a surface of the body. The second through port extends through the head part and has open opposite ends, a length between the opposite ends, and N number of electrical contacts across a width of the second through port and positioned between the opposite ends. The first port is oriented parallel to the first axis and the second through port is oriented parallel to the second axis orthogonal to the first axis.

In one example, the first port and the stem part can be oriented defining a first plane that is parallel to the first axis. The head part and the second through port can be oriented defining a second plane that is parallel to the second axis.

In one example, a first plane and a second plane of the connector can be neither perpendicular nor parallel with one another.

In one example, a first plane and a second plane of the connector can be oriented about 45 degrees relative to one another.

In one example, according to the teachings of the present disclosure, an integrated lighting and power system for cabinetry includes a driver configured to connect to a power source and having a lead and a slide connector at a free end of the lead. The system also includes a wireless receiver in communication with the driver. The system further includes one or more first light strips, each having an elongate substrate with a first end, a second end, a plurality of illumination elements spaced apart along the substrate, and multiple traces extending lengthwise along the substrate. The multiple traces include a positive power trace, a negative power trace, a first trace connected to the plurality of illumination elements, and a second trace not connected to the plurality of illumination elements. The system also includes one or more second light strips, each having an elongate substrate with a first end, a second end, a plurality of illumination elements spaced apart along the substrate, and multiple traces extending lengthwise along the substrate. The multiple traces include a positive power trace, a negative power trace, a first trace not connected to the plurality of illumination elements, and a second trace connected to the plurality of illumination elements. The system further includes a plurality of connectors configured to mount to cabinetry. Each of the plurality of connectors has a body with a first port and a second through port. The first port and second through port of each of the plurality of connectors is configured to selectively receive therein the first end or the second end of any light strip of the one or more first and second light strips. The slide connector is configured to slide onto any one of the one of the first or second light strips and contact the positive and negative power traces. The controller is configured to independently control illumination of any of the first and second lights strips connected to any of the plurality of connectors by controlling power to the positive and negative traces and selectively to the corresponding first and second traces and thus to the respective illumination elements.

In one example, the system can also include one or more wire links with a link slide connector at each end of a wire set. The wire links can be configured to connect any of the one or more first and second light strips to one another.

In one example, the system can further include one or more power pass strips each having an elongate substrate with a first end, a second end, and multiple traces extending lengthwise along the substrate. The multiple traces can include a positive power trace, a negative power trace, a first trace, and a second trace. The power pass strip can be configured to pass power along the length of the power pass strip between any two of the plurality of connectors.

In one example, according to the teachings of the present disclosure, a method of controlling multiple different illumination zones of a cabinet installation includes utilizing the cabinet system, the connectors, the light strips, and/or the integrated lighting and power systems noted above and/or herein and in any combination, and/or utilizing any one or more of the fabrication, installation, and/or operation and control steps as disclosed and described herein.

In one example according to the teachings of the present disclosure, a method of controlling multiple different illumination zones of a cabinet installation includes utilizing the cabinet system, the connectors, the light strips, and the integrated lighting and power system of any one or more of the aforementioned or below examples and in any combination thereof, and/or any one or more of the fabrication, installation, and/or operation and control steps as disclosed and described herein.

BRIEF DESCRIPTION OF THE DRAWINGS

The drawings provided herewith illustrate one or more examples or embodiments of the disclosure and therefore should not be considered as limiting the scope of the disclosure. There may be other examples and embodiments that may be equally effective to achieve the objectives and that may fall within the scope of the disclosure. Objects, features, and advantages of the present disclosure will become apparent upon reading the following description in conjunction with the drawing figures, in which.

DETAILED DESCRIPTION OF THE DISCLOSURE

Figure 1:
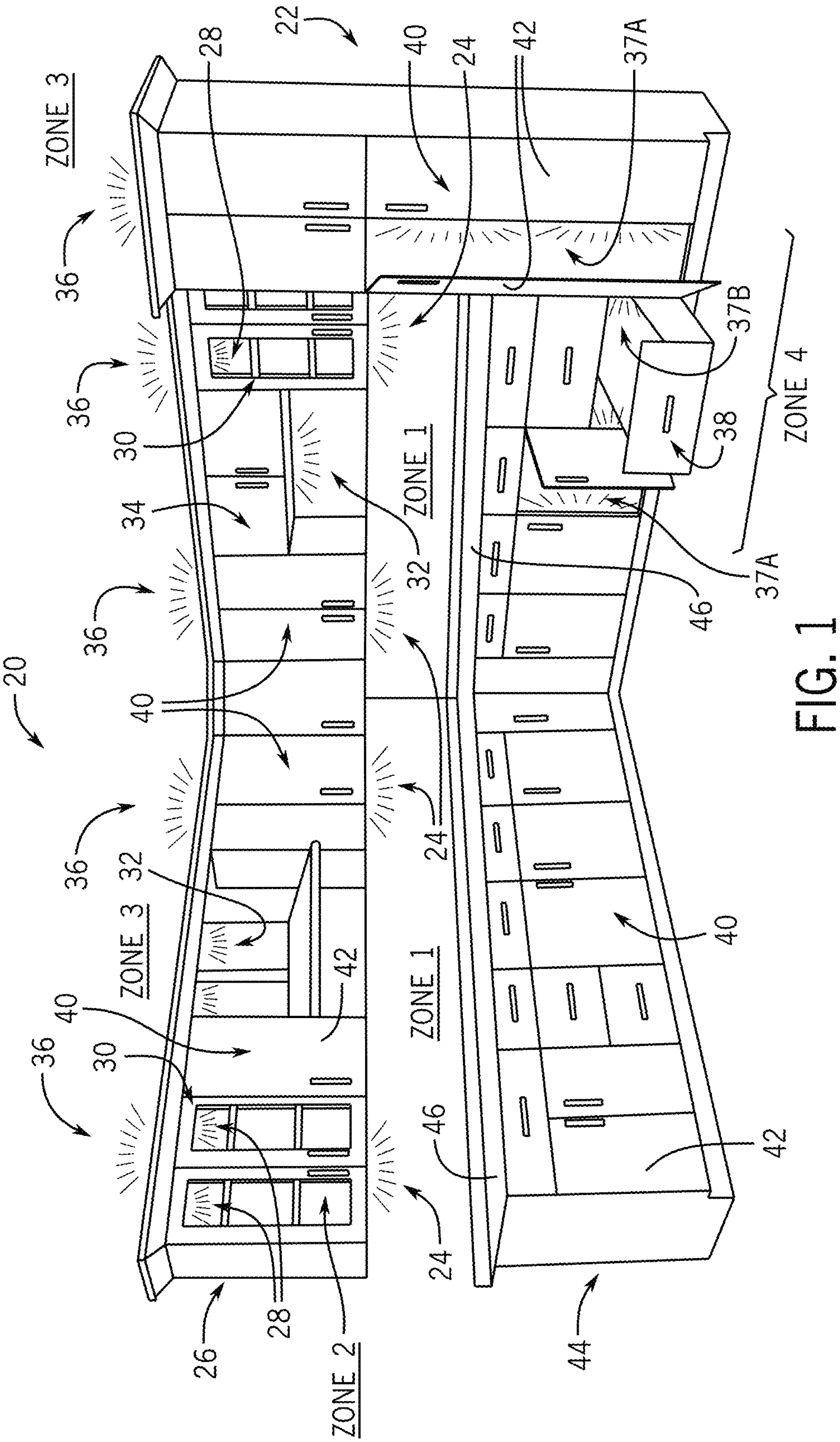
FIG. 1 shows a view of a generic cabinet arrangement and installation.

As used herein, the term "zone" or "zoned lighting" generally refers to a group of lights that are powered simultaneously by the same power channel of a lighting system. In most instances, that meaning also applies to a group of lights that are controlled (ON, OFF, DIM) together as a single unit. Exceptions are noted herein with regard to interior illumination within a solid door or solid panel cabinet and within a drawer. In this example, the lights for these types of "zones" are or may be powered by the same power channel of the lighting system. However, separate controls or an added layer of control, such as an OPEN/CLOSE or ON/OFF switch, may be applied to each solid door cabinet and/or each drawer. For these "zones", the lights for each cabinet and drawer may remain powered, but OFF, and may be turned ON independently of one another as a particular drawer or cabinet door is opened. Thus, it should be understood herein that there may be a distinction for these types of "zones" because, unlike under-cabinet (task), over-cabinet (soffit), toe kick (base or floor level), or interior glass door cabinet lighting, the solid door cabinet and drawer lighting typically have independent control features. When the lights of most zones are turned on, off, or dimmed, all the lights of that group will behave the same. In contrast, when one opens a drawer and the light comes on, the similarly powered lighting of this "zone" in other drawers or in solid door cabinets need not behave the same and can remain turned off until another particular drawer or door is opened. However, for ease of description herein, these types of controlled lighting are also identified as a "lighting zone," though it may behave differently.

As described in further detail below, the disclosed integrated lighting and power solution includes one or more a multi-channel strips that either pass power along the system, provide light while also providing multiple zone lighting capability, or both. The disclosed integrated lighting and power solution is capable of independent control of each separate zone along the various multi-channel strips (i.e., strips). The disclosed integrated lighting and power solution includes strips that may be formed having a relatively stiff structural form, so they remain straight or linear prior to and during use. Alternatively, the disclosed strips may have a substrate with some degree of flexibility. The disclosed strips can be blank or unchipped strips (with no lights, i.e., power strips) to simply pass power along the system. Alternatively, the disclosed strips can include illumination elements such as light emitting diodes (LEDs) or chips configured to provide illumination (i.e., LED strips or light strips). The strips can be multi-channel printed circuit board (PCB) strips, i.e., PCB light strips or PCB power strips. The light strips can include single channel (monochrome) LEDs or chips or can include multi-color LEDs or chips. The light strips can thus each have a different type of light source and can be connected in series, where each segment provides a different lighting characteristic for a corresponding zone of a cabinet system. Alternatively, each light strip can have multi-color and multi-channel capability, where illumination is determined by the PCB structure of the strip and by which channel is powered. The disclosed lighting and power solution also may employ unique three-way connectors that can connect adjacent strips of the system and that can be connected to a power source and controls or a lighting controller. The disclosed integrated lighting and power solution solves or improves upon one or more of the above-known and/or other problems and disadvantages with prior known cabinet lighting and power systems.

Turning now to the drawings, FIG. 1 shows one example of a cabinet system or installation 20. FIG. 1 depicts an image of kitchen cabinets or cabinetry 22 with lighting employed. The cabinet system 20 depicted in FIG. 1 includes examples of countertop lighting 24 emanating from under a plurality of wall cabinets 26. The cabinet system 20 also includes interior lighting 28 emanating from within the interior of glass door cabinets 30. The cabinet system 20 further includes accessory lighting 32 emanating from beneath shorter height cabinets 34 and/or between spaced apart taller cabinets of the wall cabinets 26. The cabinet system 20 also includes soffit lighting 36 emanating from above the wall cabinets 26. The cabinet system 20 also include interior lighting 37A, 37B within the interior of closed drawers 38 and cabinets 40 with solid front doors 42 or panels, respectively. This interior lighting 37A and 37B may provide illumination within the drawers and/or cabinets when opened.

The cabinet system 20 depicted in FIG. 1 is only one of innumerable different possible examples of a kitchen cabinet installation or system that is suitable for the disclosed integrated lighting and power solution. Other cabinet systems and installations, such as for bathrooms, work rooms, bedrooms, closets, and the like, as well as those specific to kitchens, may also benefit from employing the disclosed integrated lighting and power solution and system. The cabinet system and installation image of FIG. 1 is provided only to illustrate how the disclosed solution and system may be employed to improve upon or enhance the cabinetry and the installation process for such cabinetry. The cabinet system 20 in this example also shows base cabinets 44 below countertops 46, which are beneath the wall cabinets 26. Virtually any cabinet arrangement and installation, and installation method, could be enhanced using the disclosed integrated lighting and power solution. Regarding the wall cabinets 26, some may be joined together side to side at the same height. Others may be joined together side to side at different heights (known as castling), though not shown herein. Some cabinets may have different depths and some cabinets may have shorter heights, such as the shorter cabinets 34 in this example, than adjacent cabinets. Coastlining (i.e., the depth and height contours of the cabinets) variation in both the horizontal and vertical directions and arrangements is common.

As depicted in FIG. 1, the cabinet system 20 may have a plurality of different lighting zones accommodated by different power channels (defined further below). In the illustrated example, the cabinet system 20 includes four (4) different zones with lighting and power requirements. For ease of description, a first zone, Zone 1, may include the countertop or under-cabinet lighting 24 and the accessory lighting 32 above the countertops 46. A second zone, Zone 2, may include the interior cabinet lighting 28 for glass door cabinets 30. A third zone, Zone 3, may include the soffit lighting 36 above the upper or wall cabinets 26. A fourth zone, Zone 4, may include the interior lighting 37A and 37B within the drawers 38 and solid door cabinets 40.

The Zones 1-4 in this example define four separate powered applications for cabinet lighting to be illuminated independently according to the teachings of the present disclosure. As noted below, a cabinet system may include two (2) zones, three (3) zones (see the below system example), or more than four (4) separately controllable lighting zones or powered applications. The integrated lighting and power system may thus provide the requisite number of power channels to accommodate the number of different zones. The phrases multi-zone and multi-channel, as used herein, are intended to refer to any of these types of systems that have at least two different illumination zones or channels, where the zones or channels are separately controllable and may or may not have different illumination requirements.

Figure 2:
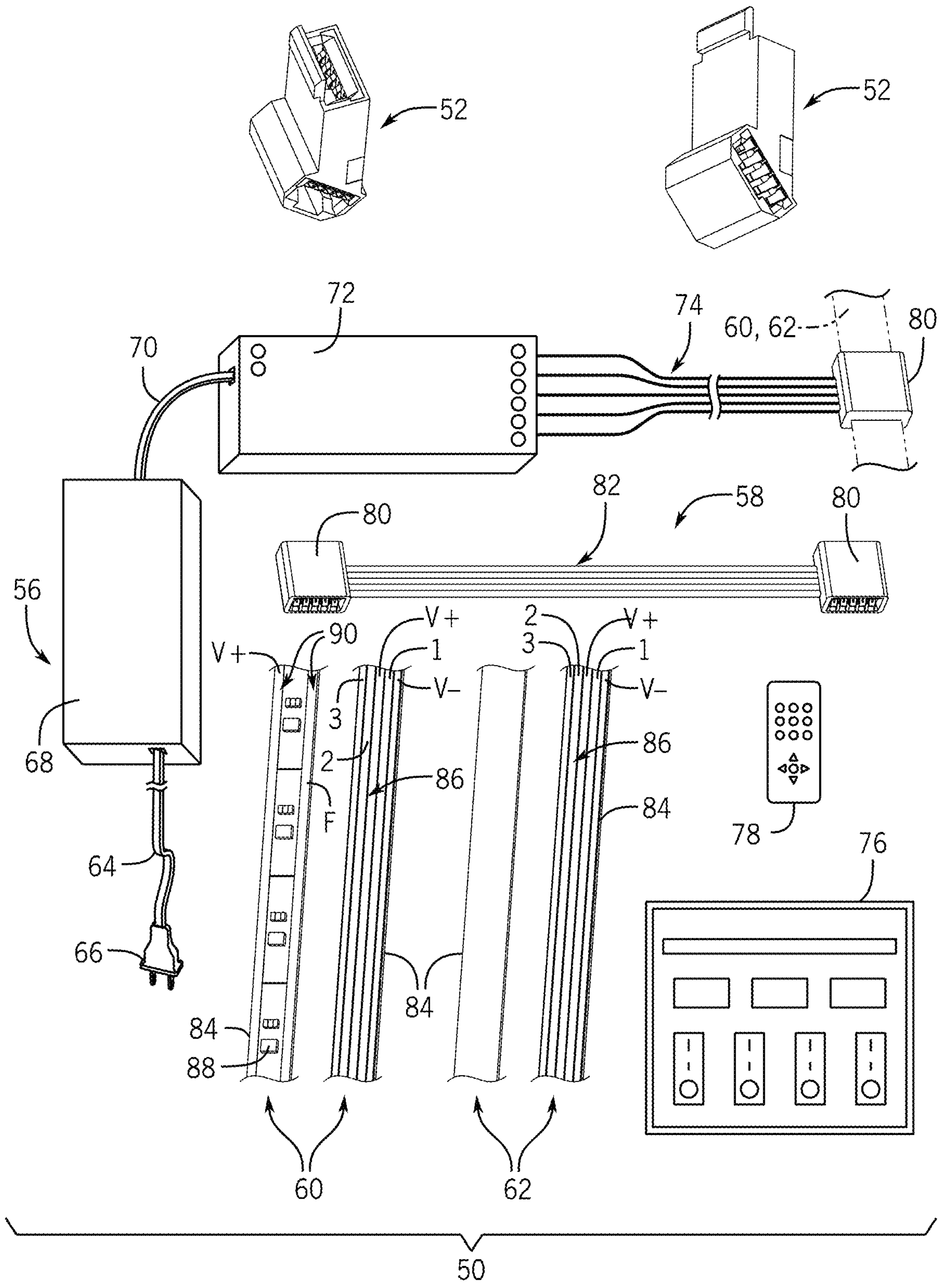
FIG. 2 shows the basic components of an integrated lighting and power system according to the teachings of the present disclosure.

Referring to FIG. 2, the disclosed integrated lighting and power solution is embodied in one example in an integrated lighting and power system, i.e., a system 50. The system 50 may include a plurality of universal connectors 52 constructed in one example in accordance with the teachings of the present disclosure. The system may also include other optional types of connectors. The universal connectors 52 and other optional connectors are described in further detail below. The universal connectors 52 (hereinafter "the connectors 52") can be configured and arranged to receive and/or connect power and strips in multiple different directions to achieve virtually any desired system configuration and to accommodate virtually any cabinet installation.

Several of the components of the system 50 are described in further detail below. However, the system 50 may generally include a plurality of the connectors 52, one or more power supplies 56, one or more cabinet link wires or jumpers 58, one or more light strips 60, and one or more power strips 62. Each power supply 56 may be an LED driver and may include a power cable 64 with a standard household 120V alternating current (AC) plug 66 and connected to a power converter and/or driver 68 that converts AC to direct current (DC), which is suitable for powering the low voltage strips and system. The driver 68 may also optionally include a processor and a memory designed and programmed to selectively control the components of the integrated lighting and power system 50. Each power supply 56 may also include an intermediate lead 70 connected to the power converter and/or driver 68. The intermediate lead 70 can be coupled to a wireless receiver or/or controller 72, which may also or instead include a processor and a memory designed and programmed to selectively control the components of the integrated lighting and power system 50. Another lead 74 can extend from the wireless receiver 72 and be configured to connect to one of the light and power strips 60 or 62, as described below.

The system 50 can include a wireless remote controller unit 76 that can be installed or placed anywhere within signal range of the installed system 50. The remote control unit 76 can wirelessly communicate with the wireless receiver 72 to selectively control functions and operation of the system 50. The system 50 may also include a hand held remote control 78 that is portable. The hand held remote control 78 can be carried by a user and can be configured to operate the system 50 wirelessly through communication with the wireless receiver 72 and/or the remote control unit 76.

Each wire link or jumper 58 may include a connector head or slide connector 80 at each end. The slide connectors or connector heads 80 may be connected to one another by a multi-channel wire or wire set 82. Similarly, the other lead 74 extending from the wireless receiver 72 may also be a multi-channel wire or wire set and be connected to a slide connector 80. As described below, the slide connectors 80 can be of the same construction as a portion of the connectors 52, or other system connectors, for simplicity of installation and use.

Each power strip 62 may include a substrate that has an elongate body 84 that carries a plurality of lengthwise traces or tracks 86 on one side. The plurality of traces 86 in this example defining the channels provided on the power strip. Each light strip 60 also includes a substrate with an elongate body 84 that carries an identical plurality of lengthwise traces or tracks 86 on one side and a plurality of illumination elements, such as LEDs or chips 88 on the other side. In this example, each of the LED or light strips 60 and power strips 62 also includes two optional, additional isolated power traces or tracks 90 on the side opposite the plurality of traces 86. These traces 90 are configured to provide isolated power only to the specific strip 60 or 62 for any elements or accessories on or connected to the specific strip, as discussed below. Further details of the power strips 62 and light strips 60 are described below.

The system 50 can include additional components or elements, as desired. The various details of the components of the system 50 can also vary from the examples shown and described herein. Details of the connectors 52, the wire links or jumpers 58, the power supplies 56, the power strips 62, the light strips 60, the wireless remote control unit 76, the hand held remote control 78, and the slide connectors 80 may also vary from the examples shown and described herein.

Figure 3:
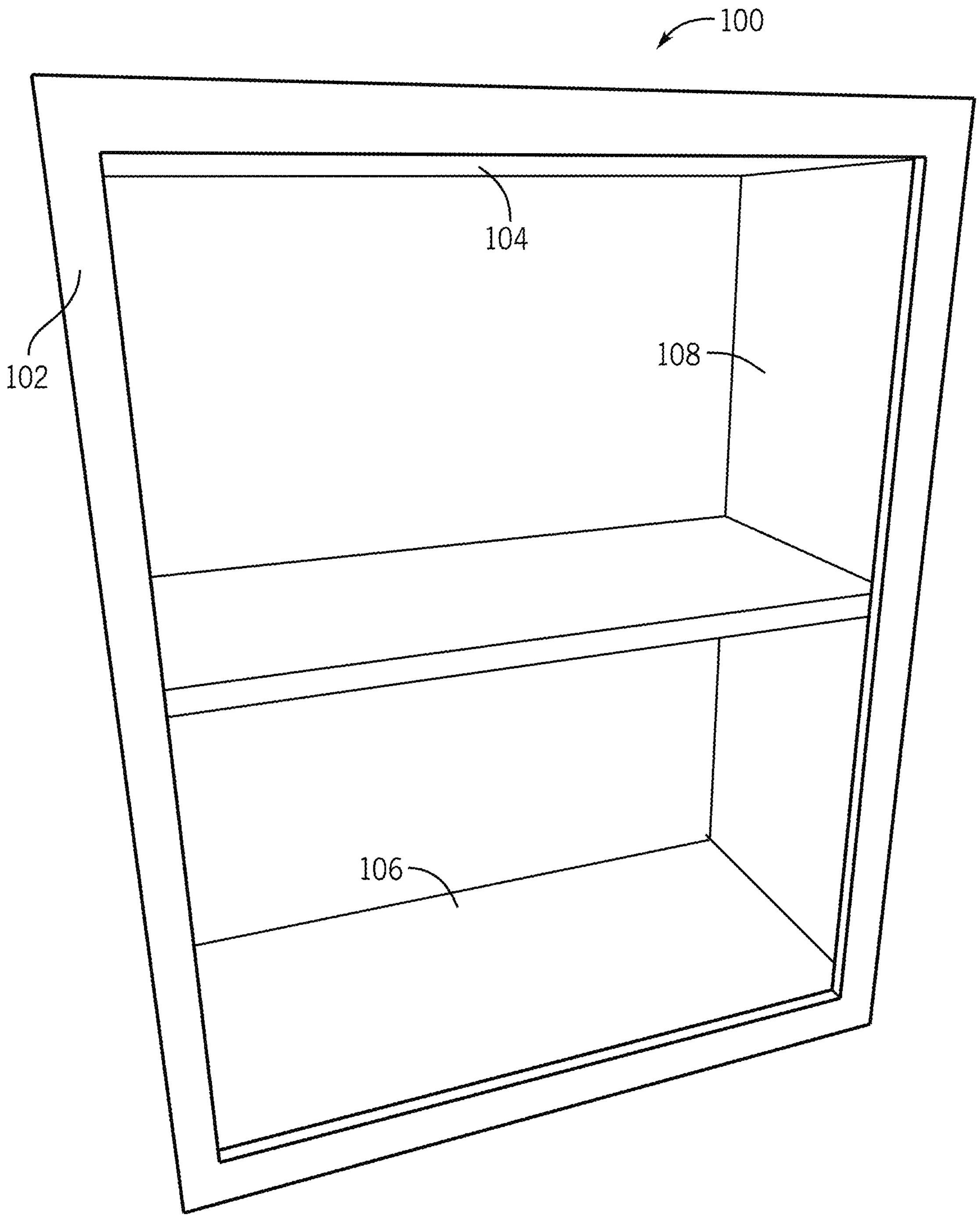
FIG. 3 shows a front view of a cabinet including (but not visible) a portion of an integrated lighting and power system, such as that shown in FIG. 2, according to the teachings of the present disclosure.
Figure 4:
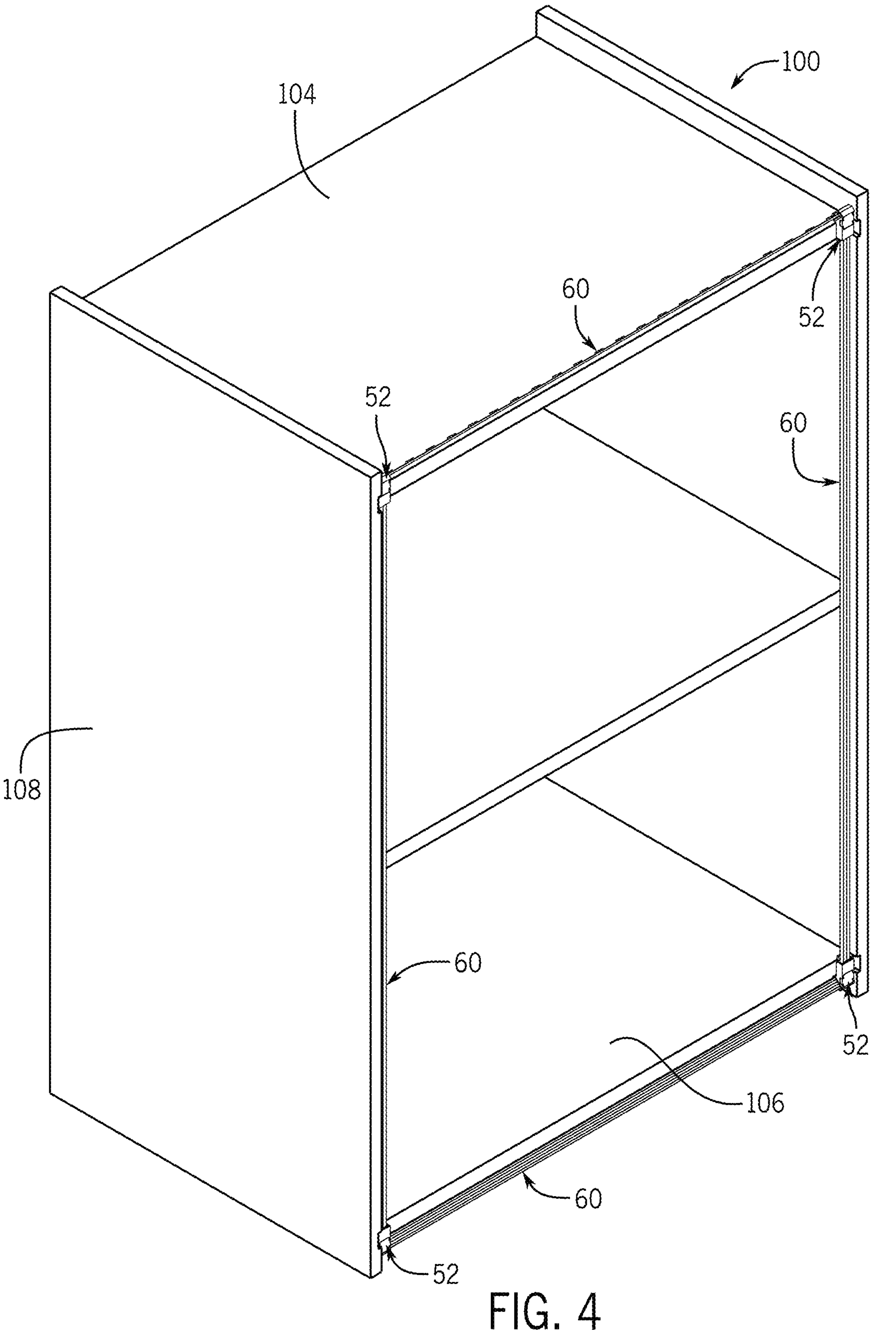
FIG. 4 shows a front perspective view of the cabinet of FIG. 3, but with the front trim removed to expose the portions of the integrated lighting and power system.
Figure 5:
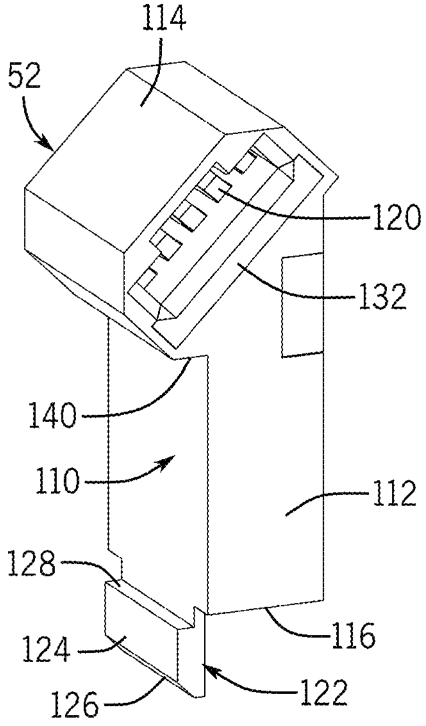
FIGS. 5-8 show various views of a connector for the integrated lighting and power systems disclosed herein, the connector constructed according to the teachings of the present disclosure.
Figure 6:
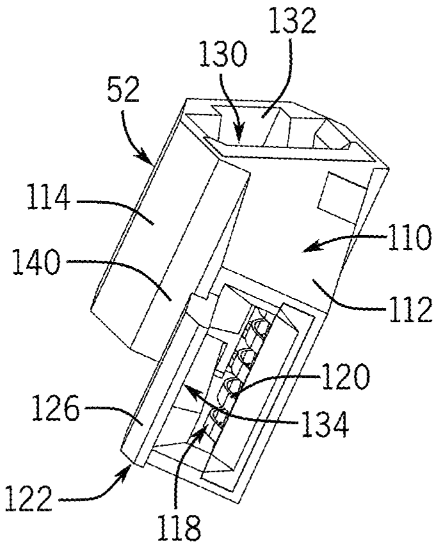
Figure 11:
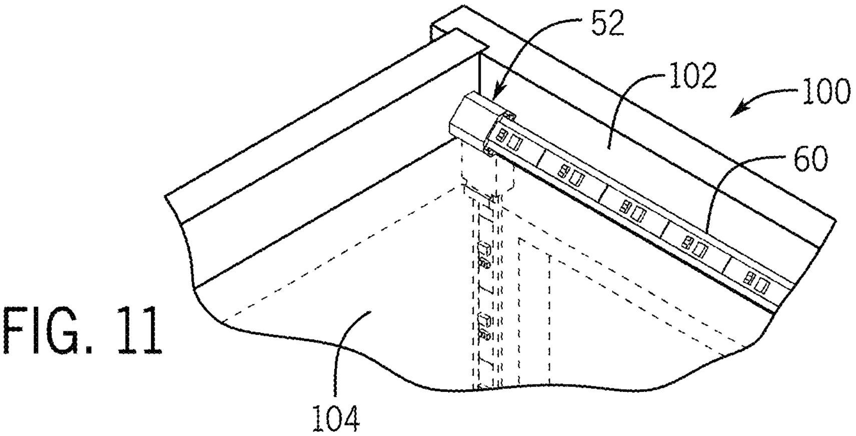
FIG. 11 shows a top right-hand side and rear view of the cabinet of FIG. 4 including a light emitting diode (LED) strip and a connector of the integrated lighting and power system of FIG. 2.

FIGS. 3 and 4 show a cabinet 100 with a portion of one example of an integrated lighting and power system installed on the cabinet. FIG. 3 shows a front view of the cabinet 100, whereby the components of the system are mounted behind and hidden by front face frame parts 102 of the cabinet, and thus are not visible. FIG. 4 shows a front view of the cabinet 100, but with the front face frame parts 102 of the cabinet removed to reveal components of the integrated lighting and power system. As depicted, the integrated lighting and power system includes a plurality of PCB light strips 60 that are mounted to the cabinet 100. In this example, the PCB light strips include a top horizontal PCB light strip 60 (viewed from the back in FIG. 4) extending across and above a top panel 104 on the outside of the cabinet 100 and behind the front trim parts 102. See also, FIGS. 11 and 12. The top PCB light strip 60 can be a part of an overhead cabinet or soffit lighting zone, Zone 3, of the system 50 (i.e., cabinet 100 may be a wall cabinet 26 as shown in FIG. 1). Similarly, the PCB light strips include a bottom horizontal PCB light strip 60 extending across and under a bottom panel 106 and outside of the cabinet 100 and behind the front trim parts 102. The bottom PCB light strip 60 can be a part of an under-cabinet or task lighting zone, Zone 1, i.e., a different zone, of the system. The PCB light strips also include two interior PCB light strips 60 extending vertically along opposed side panels 108 on the interior of the cabinet 100 and behind the front trim parts 102. See also, FIG. 13. The vertical interior PCB light strips 60 can be a part of an interior cabinet light zone, Zone 2, i.e., another different zone, of the system.

Figure 7:
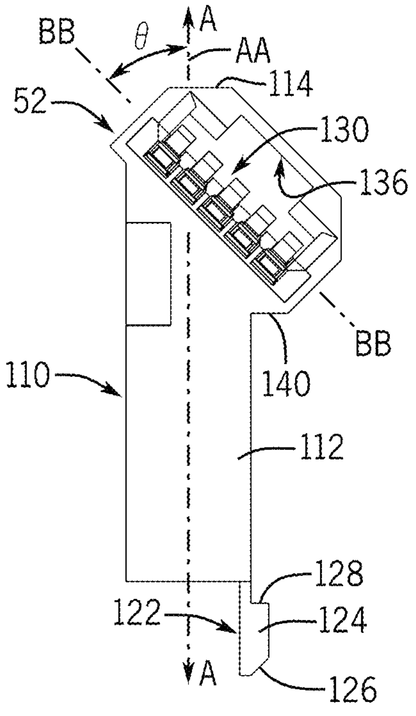
Figure 8:
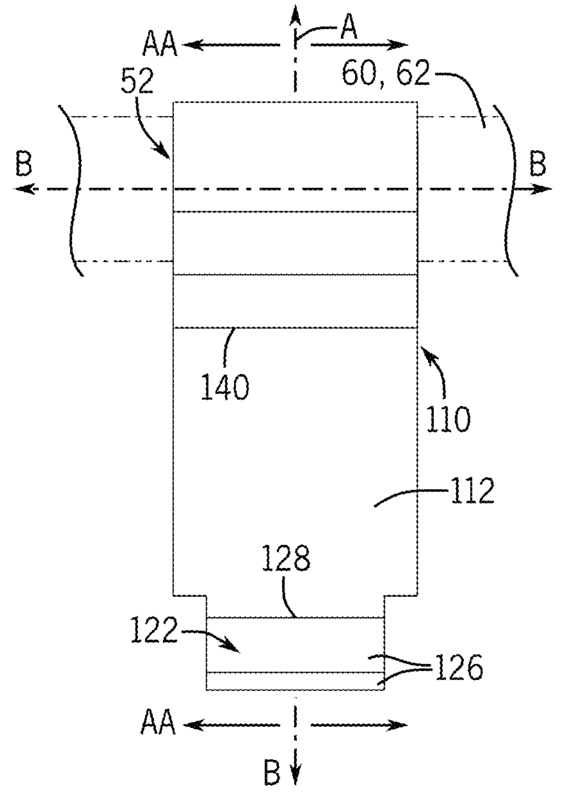
Figure 9:
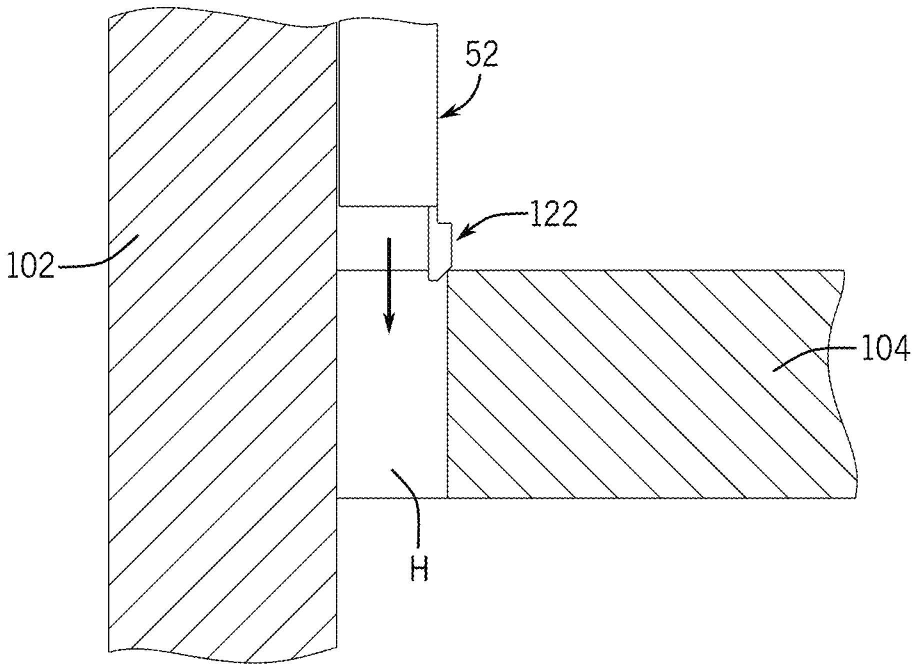
FIGS. 9 and 10 show cross-section views of a cabinet and the connector of FIGS. 5-8 being installed on the cabinet.
Figure 10:
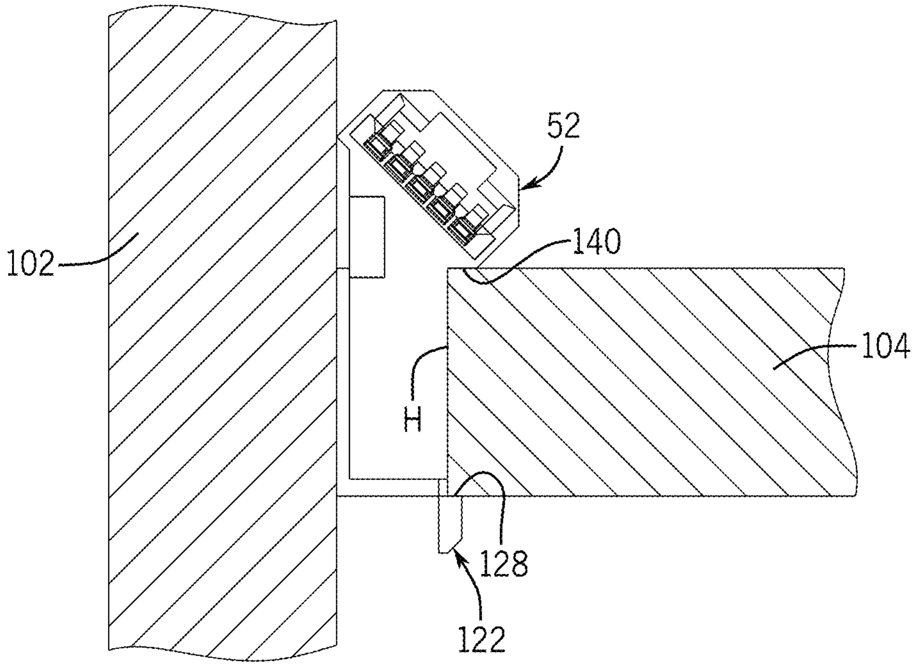

Referring to FIGS. 4-13, the integrated lighting and power system on the cabinet 100 also incorporates a plurality of the universal connectors 52 for connecting the various PCB light strips 60 of the system to one another and for connecting power to the system. As discussed further below, the connectors 52 can be mounted to the cabinet 100 on the outside of the cabinet behind the front face frame parts 102 and extend through holes in the panels of the cabinet 100, such as the top panel 104 and the bottom panel 106. In this example, a connector 52 is mounted on the left-hand upper corner of the cabinet 100 and a connector 52 is mounted on the right-hand upper corner of the cabinet on top of the top panel 104 of the cabinet and behind the front trim parts 102. See also, FIGS. 11 and 12. A connector 52 is also mounted on the left-hand lower corner of the cabinet 100 and a connector 52 is mounted on the right-hand lower corner of the cabinet underneath the bottom panel 106 and behind the front trim parts 102. As shown in FIGS. 9 and 10, holes or slots H can be formed through the top panel 104 near the front corners and through the bottom panel 106 near the lower corners to permit the vertical PCB light strips 60 to extend between and be connected to the connectors 52, as also described further below. See also, FIG. 13.

Figure 12:
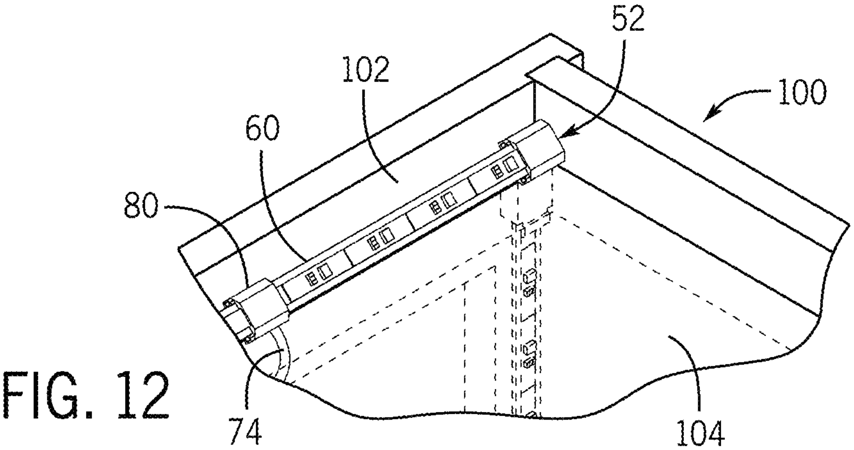
FIG. 12 shows a top left-hand side and rear view of the cabinet of FIG. 4 and an LED strip, a connector, and a power supply lead of the integrated lighting and power system of FIG. 2.
Figure 13:
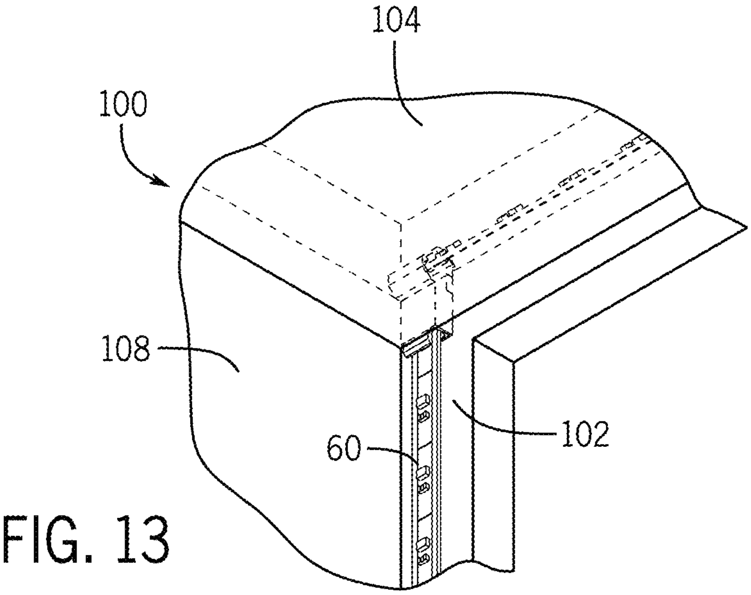
FIG. 13 shows an interior view of the top right-hand side of the cabinet of FIGS. 4 and 11 including an LED strip and a connector extending through a hole into the cabinet interior.

As shown in FIGS. 2 and 12, the system on the cabinet 100 also includes a power supply, i.e., a controller 72 and/or an LED driver or controller 56 (as shown in FIG. 2), with the wire lead 74 that is directed toward the PCB light strip 60. The slide connector 80 of the lead 74 is slid onto the PCB light strip 60 (as shown in FIG. 12) and has contacts (not shown) that are connected to the plurality of traces 86 on the strip. The lead 74 and slide connector 80 provide power to, and control operation of, at least the part of the system installed on the cabinet 100. The LED driver or controller 56 and/or wireless receive/controller 72 can be connected to any one of the light strips 60 on the cabinet 100 to provide power to that light strip and to at least the parts of the system connected to that light strip in this example and as discussed further below. As also discussed below, the component arrangement of the system can be varied from this example and can be varied from cabinet to cabinet within a given integrated lighting and power system. Variations can be made, depending on the particular lighting system design and needs.

In this example, the slide connector 80 and the lead 74 may be connectable to or extend from a controller, i.e., the wireless receiver 72, and the LED driver 56, as noted above, which can convert AC power to DC to provide power for the receiver and thus the system. The LED driver 56 and the wireless receiver 72 can be connected to a power source at an installation site by the cable 64 and plug 66. The LED driver 56 and/or wireless receiver 72 may instead be configured to be hard wired directly to the primary AC source of power at the site but is more likely to have a connectorized attachment, i.e., the plug 66, to the power source. The power lead 70 may be configured having a multi-wire set, as noted above, and the slide connector 80 may have a corresponding number of contacts ($N^+$ number of channels) that can be slid onto one of the light strips 60 connected to a connector 52, either at the installation site or at the cabinet manufacturing site. The LED driver 56 may be connectable to the wireless receiver 72 or controller or may instead have a dedicated controller function provided as a part of the power supply/LED driver for AC to DC conversion. One having ordinary skill in the art should understand that the driver 56 and receiver can be separate from one another and installed on different portions of the system. Likewise, the driver can also be configured as the controller, as noted above. Further, the receiver 782 can be configured as the controller as well. However, the system may utilize a wireless controller 76 and/or a remote control 78 to operate the system via wireless communication with the receiver 72 (or 56 if built with that additional function. The system design is adaptable to accommodate many different power and control arrangement convenient for a given use environment and system design.

Though not shown in the specific example of FIGS. 3 and 4, one or more of the PCB strips 60 can instead be a blank power strip 62 (i.e., a power pass strip) configured simply to pass power along the system from connector 52 to another and from one point to another. One or more of the PCB strips can also be light strips 60 configured to illuminate the cabinet arrangement, which may include the multiple lighting zones, as noted above. Further details and options regarding the PCB strips are provided below.

FIGS. 2 and 5-10 show one example of the universal connector 52 in greater detail and in various views. In the disclosed example, the connector 52 is provided as a corner connector in only one type, i.e., in a "universal" configuration. As depicted, the corner connector 52 is configured for use in any corner of a cabinet, i.e., the upper left-hand corner, the upper right-hand corner, the lower left-hand corner, and the lower right-hand corner. However, because of the design of one of the connector ports, the connector can be used anywhere along the length of a strip, if desired. The connectors 52 can also be installed intermediate along a run of light strip 60 or power strip 62 to re-direct power to another element or strip of the system. The connectors 52 can also be installed through other parts of a cabinet installation, such as a side panel or a rear panel of a cabinet, if needed, to direct and deliver power or other functionality to different parts of the system.

Referring to FIGS. 5-8, each corner connector 52 in this example has a body 110 formed to define two receptacles (though three openings), i.e., two sockets or ports, facing in different directions. The body 110 includes an elongate first part, i.e., a stem part 112 and second part. i.e., a head part 114 disposed at one end, i.e., a proximal end, of the stem part. The body 110, including the stem part 112 and head part 114, can be molded or otherwise formed as a unitary or monolithic structure from a suitable material such as plastic.

The stem part 112 has an elongate rectangular shape in cross section with a blind channel formed along part of the length of the stem part with an opening in the end, i.e., a distal end 116 at a surface of the body and providing access to the blind channel. The opening and blind channel form a first port 118, of the above-mentioned two receptacles, in the distal end 116 of the stem part 112. The channel and opening are also generally rectangular in cross section such that a width of the stem part 112 and the port 118 are greater than a corresponding height thereof. A plurality of electrical contacts 120 are disposed in the port 118 and the number of contacts matches the number and spacing or positioning of the electrical traces 86 of the light strips 60 and the power strips 62. As discussed further below, a light or power strip can be inserted into the port 118 so that the contacts 120 and traces 86 engage or touch. In this example, the stem part 112 defines a lengthwise axis A parallel to the insertion direction of the first port 118 and defines a plane AA across the width thereof along the axis A that is generally parallel to a PCB strip 60 or 62 when inserted therein and thus parallel with the blind channel in the widthwise direction.

In this example, the stem part 112 also includes a flexible finger or tab 122 protruding from the distal end 116 along one long edge adjacent the port 118. The finger or tab 122 in this example may, in a nominal or rest position, be parallel with the axis A and the plane AA defined by the stem part 112 and may have a width that is slightly less than the width of the stem part 118. The width of the finger or tab 122, however, may be smaller still, or may be equal to or even greater than the width of the stem part 112. A catch 124, i.e., a projection or protrusion, stands off of or extends from the flexible tab or finger 122 in a direction away from the axis A and the opening into the port 118. The catch 124 is also spaced from the distal end 116 of the stem part 112 around the first port 118. The catch 124 includes an angled or ramped surface 126 facing in a direction away from the port 118 and includes a catch surface 128 facing in the opposite direction toward the proximal end of the stem part and head part 114.

As shown in FIGS. 9 and 10, the angle of the ramped surface 126 may vary but is intended to allow the stem part 112 of the connector 52 to be inserted into and through a hole H in a cabinet. As the stem part 112 is inserted into the hole H, the ramped surface 126 of the catch 124 contacts and then clears the opening into the hole H. The angle of the ramped surface can vary, but in one example may be about 45 degrees relative to the axis A and plane AA defined by the stem part 112. As the stem part 112 is inserted into the hole H in the cabinet, the finger or tab 122 bends, permitting the stem part 122 to be pushed through the hole H. When the catch 124 clears the other side of the hole H, the finger or tab 122 resiliently snaps back to the nominal or rest position. The catch surface engages a surface of the cabinet on the other side of the hole H, retaining the connector 52 therein. The angle of the catch surface 128 can also vary but in most instances would be about 90 degrees relative to the axis A and plane AA defined by the stem part 112. In the disclosed example, separate fasteners, such as screws or nails, are not required to install the connectors 52 of the system. This reduces the number of parts required to install the system and reduces the number of tools, labor, and time required as well.

The head part 114 is integrally joined to the proximal end of the stem part 112 and generally has a box-like shape. The length of the head part 114 in this example matches the width of the stem part 112 based on the orientation of the head part. More specifically, a through channel is formed along the length of the head part 114 with an opening 132 at each opposite end of the head part providing access to the through channel. Each of the openings and the through channel respectively and collectively form a second port 130, i.e., a second through port of the above-mentioned two receptacles of the connector 52. The through channel and openings in the head part 114 are also generally rectangular in cross section such that a width of the head part and the second through port 130 are greater than a corresponding height thereof.

A plurality of electrical contacts 120 are also disposed in the second through port 130 and may be positioned mid-way between the two openings 132. Again, the number of contacts 120 matches the number and spacing or positioning of the electrical traces 86 of the light strips 60 and the power strips 62. As discussed further below, a light or power strip can be inserted into either of the openings 132 so that the contacts 120 and traces 86 engage or touch. In the first port 118, the contacts may be placed near the opening into the blind channel or deeper into the depth of the first port. Thus, a PCB strip 60 or 62 inserted therein can make electrical contact without having to be fully inserted into the ports.

In this example, the head part 114 defines a lengthwise axis B parallel to the insertion direction of the second through port 130. The head part 114 also defines a plane BB across the width thereof along the axis B that is generally parallel to a PCB strip 60 or 62 when inserted therein, and thus parallel with the through channel in a widthwise direction. In this example, the axis A of the first port 118 and the axis B of the second through port 130 are generally orthogonal or perpendicular to one another. However, the planes AA and BB are neither parallel or perpendicular to one another. Instead, as shown in FIGS. 7 and 8, the head part 114 is oriented at an angle θ relative to the stem part 112 when viewed from the side of the stem apart and thus along the axis B of the head part. In this example, the angle θ between the planes AA and BB and thus between the stem part 112 and the head part 114 may be about 45 degrees. However, this angle may vary, depending on the desired LED light strip 60 orientation desired in a cabinet installation.

The angle θ may vary, for example, between 0 degrees (planes AA and BB being parallel) and 90 degrees (planes AA and BB being orthogonal), or even greater, if desired. The angle θ determines the orientation of the PCB strip, such as the light strip 60 and the LED's thereon, when installed in the second through port 130. The 45 degree angle tilts the strip at 45 degrees so that, if the strip is positioned under a cabinet, the strip and LEDs are directed downward and rearward and if the strip is positioned above a cabinet, the strip and LEDs are directed upward and rearward. Likewise, if the angle θ were 0 degrees, the strip would face directly rearward and if the angle were 90 degrees, the strip would face directly downward (under a cabinet) or upward (above a cabinet). Though not shown herein, the connectors 52 may be designed so that the angle θ of the head part 114 is adjustable relative to the stem part 112 to select the desired strip orientation in a given installation.

As shown in FIGS. 5-8, the shape of the blind channel in the stem part 112 includes a groove 134 formed in a lengthwise direction into a surface opposite the contacts 120. Likewise, the shape of the through channel in the head part 114 includes a groove 136 also formed in a lengthwise direction into a surface opposite the contacts 120. Each of these grooves 134, 136 is provided to create clearance or room for the LEDs or chips 80 on the PCB light strips 60 when inserted into the ports 118, 130.

As shown in FIGS. 9 and 10, when the stem part 112 is inserted into the hole H, the first port 118 may, in this and in many examples, face either directly downward or directly upward into a cabinet. In this example of a connector 52, the axis B of the head part 114 is oriented parallel with the width of the cabinet so that PCB strips 60 or 62 extending between corner connectors 52 across a cabinet run generally parallel or straight across the cabinet. Thus, the width of the stem part 112, including the first port 118, i.e., the plane AA, is also oriented in a widthwise direction of the cabinet in this example. As a result, a PCB light strip 60 connected to the first ports 118 and extending vertically between upper and lower connectors 52 in a cabinet is oriented facing directly rearward inside of a cabinet. In an alternate example not shown herein, the stem part 112 may be configured to be rotatably adjustable about the axis A relative to the head portion to change the orientation of a strip connected to the first port 118.

In this example, with the stem part 112 inserted into a hole H in the cabinet, the head part 114 resides either above or below the cabinet on the outside of the cabinet interior space. In this way, the head part 114 and the stem part 112, which resides inside the hole H, of the connector 52 do not interfere with any surface or space within the cabinet during use, while still allowing connection to the interior vertical PCB strips 60 or 62 along the side panel 108 of a cabinet. As shown in FIGS. 5-10, a stop surface 140 is formed on or by the head part 114 and faces the catch surface 128 on the catch 124. The distance between the stop surface 140 and the catch surface 128 can be selected to accommodate a specific or a standard cabinet wall thickness into which the hole H is formed. Thus, once installed, the stop surface may be borne against or adjacent an exterior surface 142 of a cabinet panel and the catch surface 128 may be borne against or adjacent an interior surface of the same cabinet panel. The stop surface and/or the size of the head part 114 can thus be configured to prevent the connector 52 from passing completely through the hole H when the stem part 112 is inserted in the hole.

In the disclosed example, the first and second ports 118, 130 are each configured to receive an end of a PCB strip, as discussed further below. As shown in FIG. 12, power is delivered to the system via a power lead connected to the LED driver 56. In the disclosed example, as shown in FIGS. 2 and 12, the power lead may be the lead 74 extending from the wireless receiver 72, which is connected to the LED driver 56 via the lead 70. The lead 74 terminates at the slide connector or head connector 80. The slide connector 80 may be configured to have the same or a similar configuration to the head part 114, as described above, except only one set of connectors 120 would be needed within the through channel of the slide connector. As shown in FIG. 12, the slide connector can be slid onto a PCB light strip 60 or power strip 62 of the system. In this way, power can be delivered to the strip and thus to the system from the LED driver 56 through the slide connector 80.

As noted above, the shape and configuration of the universal connectors 52 can vary from the examples shown and described. The body 110 can be a molded plastic material or can be formed from other suitable materials and/or manufacturing methods. Each socket or port 118, 130, and 132 can include appropriate number and type of contacts 120, as shown in FIGS. 5-8, to make the necessary electrical connections with the PCB strips 60, 62 for the integrated light and power system described herein and further below.

Referring to FIG. 2, and as mentioned above, the configuration of the plurality of light and power strips 60, 62 can also vary. The blank or power pass strips 62 can include the body 84 made from PCB substrate material with continuous, lengthwise extending, straight or linear conductors or traces 86, such as copper traces, spaced apart on the one side of the PCB substrate. The blank or power pass strips 62 can also include the isolated conductors or traces 90 on the opposite side of the body 84. In this example, the isolated traces 90 are disposed adjacent the apposed edges on the opposite side of the body 84. The power pass strips 62 can be cut anywhere along their length to a specific desired length because the PCB power pass strip is unpopulated with LEDs and/or resisters.

In one example the power pass strips 62 can include five (5) conductors or traces 86, with one conductor for delivering or carrying positive power or voltage (V+), one conductor for delivering or carrying negative power or voltage (V−), and the other three (3) conductors or traces provided to pass signal for up to three separate zones. The number of conductors or traces 86, and thus the number of zones, can vary and does not need to be limited to three (3) zones, as mentioned above. Likewise, the corresponding positioning of the contacts 120 in the first and second ports 118, 130 of the connectors 52 can be provided to require insertion of the blank or power pass strips 62 with the traces 86 facing a specific direction in order to engage or touch the contacts 120. The specific positioning of the contacts 120 is discussed further below relating to insertion of the LED or light strips 60. However, with the contacts 120 facing as shown in FIGS. 5-8, the traces or conductors 86 would not be exposed or visible when installed and instead will face a surface of the cabinet when installed.

The plurality of strips 60, 62 can also include one or more different types of light strips 60, depending on the needs of a particular system design. In one example, the light strips 60 can include the body 84, also made from relatively rigid PCB substrate material. The light strips 60 also include a plurality of illumination elements, electrical components, or light emitters, i.e., LEDs, diodes, or chips 88, which are spaced apart along the length of the PCB substrate. The PCB substrate material of the light strips 60 also includes the continuous, lengthwise extending, straight or linear conductors or traces 86, such as copper traces, on the PCB substrate on the side opposite to the LED's or chips 88. The light strips 60 include the same number of conductors or traces 86 as the power pass strips 62, which in this example is five (5) conductors or traces. Again, one conductor or trace 86 is for delivering or carrying positive power or voltage (V+), one conductor or trace 86 is for delivering or carrying negative power or voltage (V−), and the other three (3) conductors or traces are for passing a signal along the strip 60 for up to three zones. One of the conductors or traces 86, i.e., one channel of the light strip 60, may be connected to the LEDs or diodes 88 along the strip and the other two conductors or traces 86 can simply bypass the strip. The LEDs 88 on the light strip 60 are illuminated when that channel or trace 86 is active, i.e., when power is passed or turned on along that specific channel.

In the disclosed example, the PCB strips 60, 62 have three channels or zone traces 86, i.e., N1 to N3, and one positive voltage trace V+ and one negative voltage trace V−. In other examples, fewer or more such traces can be provided to accommodate fewer or more channels. For example, PCB strips and corner connectors could be designed to accommodate 1, 2, 4, 5, or 6 zones, if desired. The number of conductors or traces 86, and thus the number of zones defined by the light strips 60, can also vary and does not need to be limited to the three (3) zones of the examples shown and described herein.

The traces or conductors 86 can be provided on either side of the PCB light strips 60 and thus can be on the same side as the LEDs or chips 88. However, in this example, the traces 86 are on the side of the PCB body 84 opposite the LEDs 88. Likewise, the corresponding positioning of the contacts 120 in the ports 118 and 130 of the connectors 52 can be provided to accommodate insertion of the light strips 60 with the traces 86 facing the desired direction. If the traces 86 and the LEDs are on the same side of the strip body 84, the blank or power strips 62 would be installed in the opposite facing direction described above, i.e., with the traces facing away from the cabinet surfaces when installed.

In one example, the three (3) conductors or traces 86 can be for controlling multiple different types of light strips 60, such as three (3) types of light strips used within an integrated lighting and power system 50. One type of light strip 60 may be used for three of the four lighting or illumination zones of the cabinet installation 20 described above. A modified light strip 60, 62 could be employed to capture all four (4) of the above-described zones, if desired. For example, under cabinet PCB strips 60 may carry LEDs 88 on the body 84 that are connected to the V+ and V− conductors or traces 86 and a first one of the three additional conductors or traces designated for Zone 1 in FIG. 1. The PCB light strips 60 for Zone 1 will pass voltage along the V+ and V− conductors, as well as all one, two or all three zones all the way from one corner connector 52 to the other along the strip, depending on the controls. However, the LEDs or chips 88 will only tap the V+, V−, and Zone 1 conductors or traces 86 on the Zone 1 strips to illuminate the LEDs 102 of Zone 1 to illuminate spaces and work surfaces under cabinets. See the cabinets 26 and Zone 1 in FIG. 1 and the bottom horizontal strip exposed in the cabinet 100 in FIG. 4.

The vertical PCB light strips 60 on the inside of a glass door cabinet 30, 100 will also pass voltage along the V+ and V− traces 86 plus one, two, or all three zone traces, depending on the controls. See the cabinets 30 and Zone 2 in FIG. 1 and the vertical strips 60 in the cabinet 100 in FIGS. 4 and 13. The LEDs 88 on the body 84 of these types of PCB light strips 60 will be connected or tapped to the V+ and V− conductors 86 and only the conductor or trace for Zone 2 of FIG. 1 on the strips. Further, the over cabinet PCB light strips 60 may be a third type of light strip and will have LEDs 88 on the body 84 connected or tapped to the V+ and V− conductors or trace 86 and only to the Zone 3 traces. See the cabinets 26 and Zone 3 in FIG. 1 and the top exposed strip 60 on the cabinet 100 in FIGS. 4, 11, and 12. In one alternative, where four zone traces are provided on the strips, a fourth type of PCB light strips 60 can similarly have LEDs 88 on the body 84 connected or tapped to the V+ and V− conductors 86 and only to Zone 4 conductors or traces (not shown) on the strips. The fourth type of PCB light strips (not shown) can be used inside the cabinet arrangement of FIG. 1, for example, within Zone 4 to illuminate solid door cabinets 40 and drawers 38.

In another alternative, the fourth type of PCB strips, or any of the PCB strips, could be configured to be tapped to power external devices or to support additional design options. For example, a system can have Zone 2 PCB light strips 60 to illuminate glass door cabinets where it is desirable for the lights to be illuminated even when the glass doors are closed. A system can have Zone 4 PCB light strips 60 within solid wood cabinet doors, where it may be desirable to always want the lights to turn on when the door is opened and to turn off when the door is closed. Thus, the aforementioned isolation traces or conductors 90 may be utilized to provide such alternate functions or features. In some examples, a reed switch, a motion sensor, or the like (not shown) may be provided on a slide connector accessory 150 shown in FIG. 19. The slide connector accessory 150 may be slid onto a PCB strip 60 to change the function of the LEDs or to activate the LEDs in a desired manner (such as through a separate ON/OFF switch attached to the strip) isolated from the system ON/OFF power.

Figure 19:
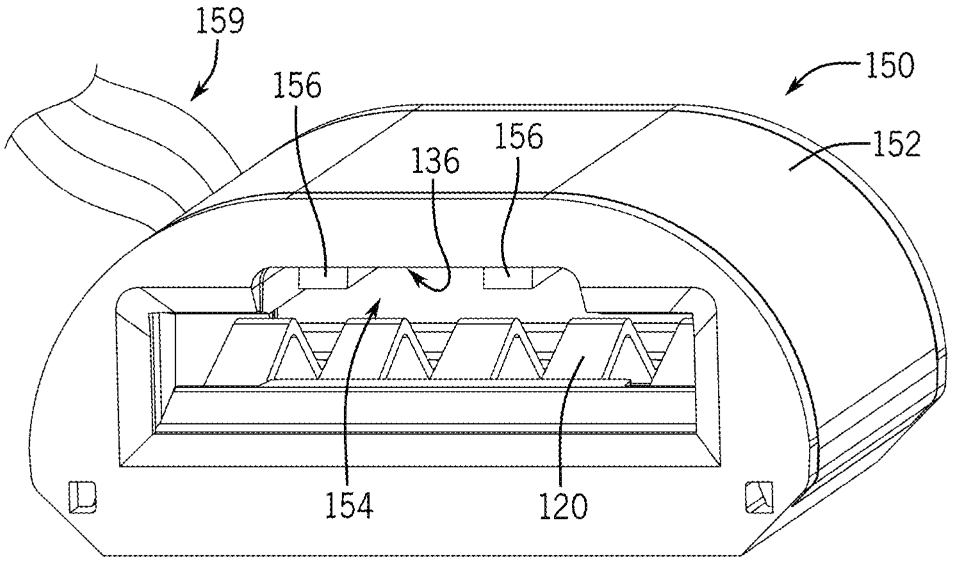
FIG. 19 shows one example of a connector that can function as or be modified to function as a slide connector, a link slide connector, or an accessory connector as disclosed and described herein according to the teachings of the present disclosure

The slide accessory 150 of FIG. 19 may be identical to the slide connectors 80 as noted above, other than the wires that are connected to the connectors. In one example, the slide connectors 80 and slide accessory 150 may be identical or nearly identical to the head part 114 of the connector 52, without the stem part 112. The slide accessory 150 has a body 152 that may carry or be connected to the one or more accessory features, devices, or the like, such as through wires 159 extending from the body 152 or connected to the body. The body 152 of the slide accessory 150 may have a through channel with an opening at each end that forms a through port 154 through the body, like the second through port 130 of the connector 52. Contacts 120 may be provided within the through channel and be accessible via either opening to the through port 154, matching the traces of the strips 60, 62. The accessory connector 150 may also include additional contacts 156 to contact the optional accessory traces 90 on the strips, as discussed above. The size and shape of the through channel and port 154 may be configured the same as or similar to that discussed above for the connector 52 and the slide connectors 80. One of the isolated traces 90 can be a positive power V+ or negative power V− conductor connected to power to deliver voltage to the side of the strip on which the accessory traces 90 reside. The other isolated F trace can be an isolated function trace that is isolated from the zone traces 86 on the other side of the PCB strip 60. The contacts 156 are positioned in the through channel to engage or touch the isolated voltage trace 90 and the isolated function F trace. In this example, the voltage traces V+ and V− and the three (3) zone traces on the other side of the strip 60 may pass power along the trip 60 from one connector 52 to another but may not be connected or tapped to the LEDs or chips 88 on the strip. Instead, the LEDs 88 may be tapped or connected to the voltage and isolated F traces 90 on the strip for separate control.

In one example, the contacts 156 of the slide accessory 150 engage the V+ trace 90 and the isolated F trace and are connected to a reed switch (not shown) of the slide accessory 150. The strip 60 and the slide accessory 150 can be installed in a drawer 38 of a solid door cabinet 40. The reed switch can be configured to close a circuit and illuminate the LEDs 88 on the strip 60 when the drawer 38 or a solid door 42 of the solid door cabinet 40 is opened. The reed switch can also be configured to open the circuit and cut off power to the LEDs 88 on the strip 60 when the drawer 38 or the door 42 is closed. Thus, the strip 60 in this example may be isolated from the rest of the integrated lighting and power system 50 with independent functionality, while still passing power along the system. In another example, the slide accessory 150 may include a motion sensor (not shown) that illuminates the LEDs for a period of time upon detecting motion, without that particular zone of the system being turned ON. Other accessories and functionality may also be provided on or by the slide accessory 150.

In each example of the connectors 52, the ports 118 can have a substantial depth. The contacts 120 can be designed to provide electrical contact at or near the entry opening into the ports, as noted above. The depth of the ports may be a minimum of one-half of the spacing interval between the electrical components or LEDs 88 on the PCB light strips 60. The depth may be at least a maximum of the spacing interval between the components or LEDs 88 on the light strips 60. For example, each PCB light strip 60, regardless of which zone type, can be provided in long uncut strips. The strips 60 can have, for example, a one inch cut interval and can have one LED 88 or diode per inch along the length of the bulk PCB light strips. Similar to the power pass PCB strips 62, the PCB light strips 60 can also be provided in long uncut lengths to be cut to length to meet the needs of a particular system design. In this example, the depth of the ports of the connectors can thus be a minimum of a one-half inch depth and a maximum of a one inch depth. The depth of the ports can thus allow the rigid strips 60, 62 to be roughly cut to length, be inserted into the ports, and still make electrical contact within the ports. Further, the contacts in the through ports 130, 154 of the connectors 52 and 80 and the slide accessories 150 can be similarly spaced relative to the openings (i.e., based on the length of the through ports) so that the strips can be roughly inserted but still reach the contacts 120 in the through ports.

In the disclosed example, the rigid PCB strips 60, 62 may be made from aluminum, fiber board, or the like. The PCB strips may include long copper traces 86, and optionally copper traces 90, that extend the length of the strips. On each light strip 60, one of the traces 86 (and/or 90) also connects the diodes or LEDS 88 along on the length of the substrate. The diodes or LEDs 88 may be spaced at one LED per inch along the strip, as noted above, although other spacing intervals may also be utilized. The long, exposed traces 86, 90 allow the PCB strips 60, 62 to be inserted into the selected first port 118 or second port 130 of a corner connector 52 (or a slide connector or slide accessory) to varying degrees. Thus, the PCB strips 60, 62 do not have to be precisely cut in order to make a proper electrical connection. Further, manufacturing tolerance in cabinetry can be up to $1/16^{th}$ of an inch or more. The PCB strip and connector port design can also accommodate this type of relatively large tolerance, as electrical connections can be made to varying degrees between each PCB strip end and the corresponding port. Since the corner connectors and slide connectors (head and accessory) have the electrical contacts at the mouth of the connector opening (see FIGS. 5-7), a PCB strip gets its power whether it is inserted a lot or just a little into a port. In the disclosed example, with a half inch of play at both ends of the PCB strip, one can match virtually any tolerance or cabinet dimension.

As noted above, in one example, the intent of the disclosed integrated lighting and power system is to allow for different PCB strips offering different lighting characteristics on a single, seamless infrastructure. In one example, the PCB light strips 60 can include strips that use only monochrome LED chips 88. In other examples, more expensive, more complex, multi-zone chips could be utilized and/or multi-colored LEDs could also be utilized. However, the controller or wireless receiver and system would become much more complex. In the disclosed example, the PCB light strips allow the controller to manage each zone without the chip needing to support multiple zones. In addition, for most installations, only one zone, i.e., channel or trace 86, will be utilized for each active PCB strip.

The different monochrome PCB strips can then be offered having brighter chips, dimmer chips, chips of different Kelvin, and the like. For example, under cabinet lights are typically brighter to provide good task lighting. Over cabinet lights are generally not as bright, i.e., are softer, for more accent/mood lighting. Some users may prefer cooler lighting for the interior of wood door cabinets, as it provides better visual acuity at the same lumen level. In other examples, some PCB strips may have front facing LEDs and other PCB strips may have side emitting diodes. More complex PCB strips can even allow control of two zones on the same strip. For example, under cabinet PCB strips may have one zone of side emitting diodes, which may face the backsplash. The other zone on the same PCB strip may have down facing diodes to brightly illuminate the countertop. Thus, on such a light strip, some of the chips or LEDS 88 would be connected to the V+ and V− traces 86 and one of the zone traces, and the other chips or LEDs would be connected to the V+ and V− traces and a different one of the zone traces to be controlled independently. The variety of the PCB strips can vary within the spirit and scope of the disclosure.

Referring to FIGS. 5-10, the bodies 110 of the connectors 52 in this example have orthogonal flat surfaces and sharp corners and edges. This allows the ports 118, 130 to easily be positioned to face in different orthogonal directions on faces of the connectors. This also allows the connectors 52 to be "corner" connectors, as they fit snuggly into right angle corners of the cabinets or against planar surfaces of the cabinet panels. See FIGS. 11 and 12, for example. This also allows the ports 118, 130 to be closely adjacent a surface of the cabinet and the strips 60, 62 to extend closely along a cabinet surface. However, the size, shape, and contour of the connectors 52, as well as the slide connectors 80 and slide accessories 150 can vary from those shown and described herein. One example is described briefly below referring to FIGS. 20 and 21.

Figure 14:
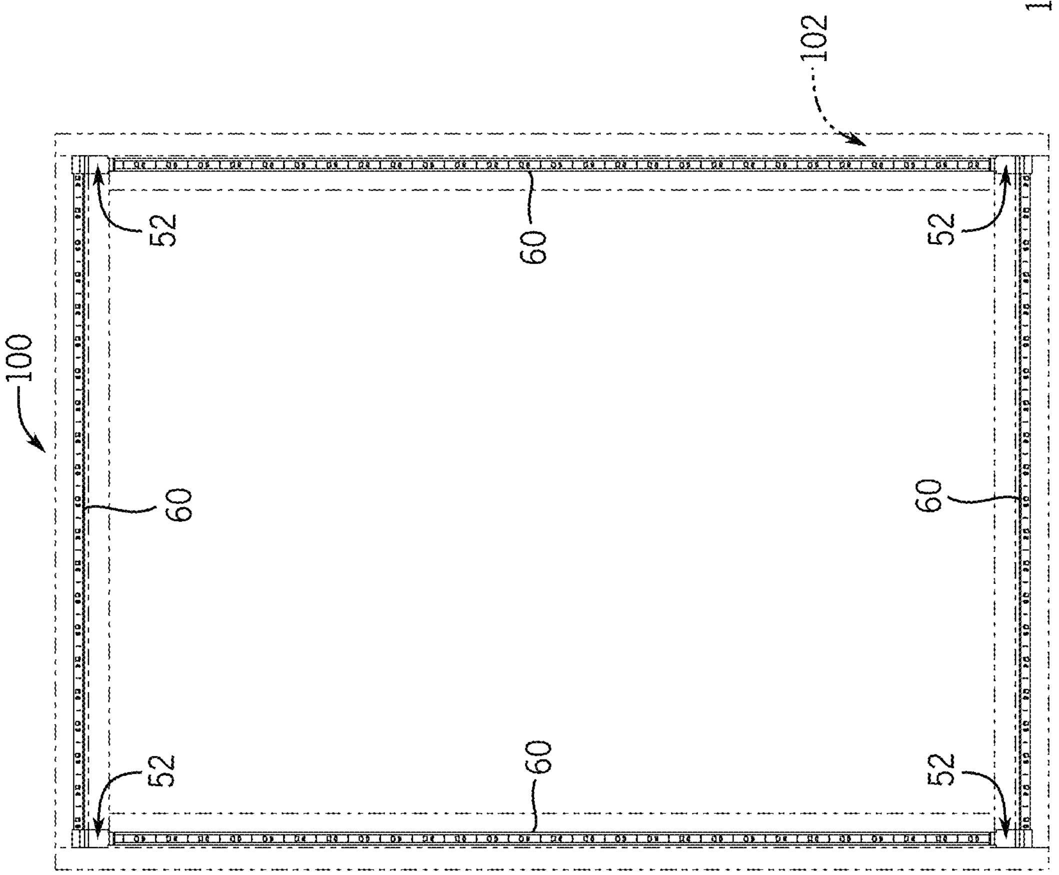

In the disclosed example, the integrated lighting and power system 50 can be configured in a number of different ways to accommodate various designs. The cabinet 100 of FIGS. 3, 4, and 11-13 is represented in the arrangement of FIG. 14. In this arrangement, power can be connected to one of the PCB light strips 60 between two corner connectors 52 (see FIG. 12). The arrangement includes an over cabinet PCB light strip 60 that illuminates an area above the cabinet 100. The arrangement also includes an undercabinet light strip 60 that illuminates an area beneath the cabinet 100. The arrangement also includes two vertical interior PCB light strips 60 that illuminate the cabinet interior. The strips are joined to one another through the various corner connectors 52.

Figure 15:
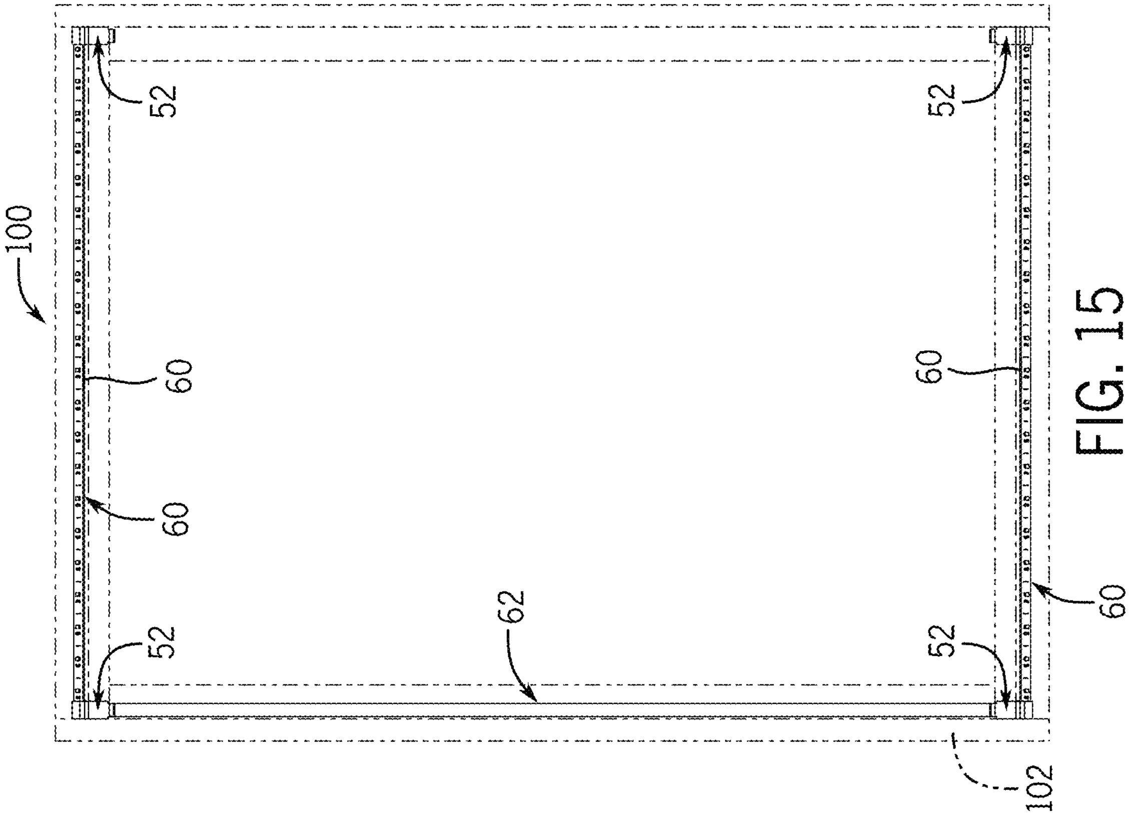
FIGS. 14-18 show various different configurations of an integrated lighting and power system installed on cabinets in accordance with the teachings of the present disclosure.
Figure 17:
Figure 16:
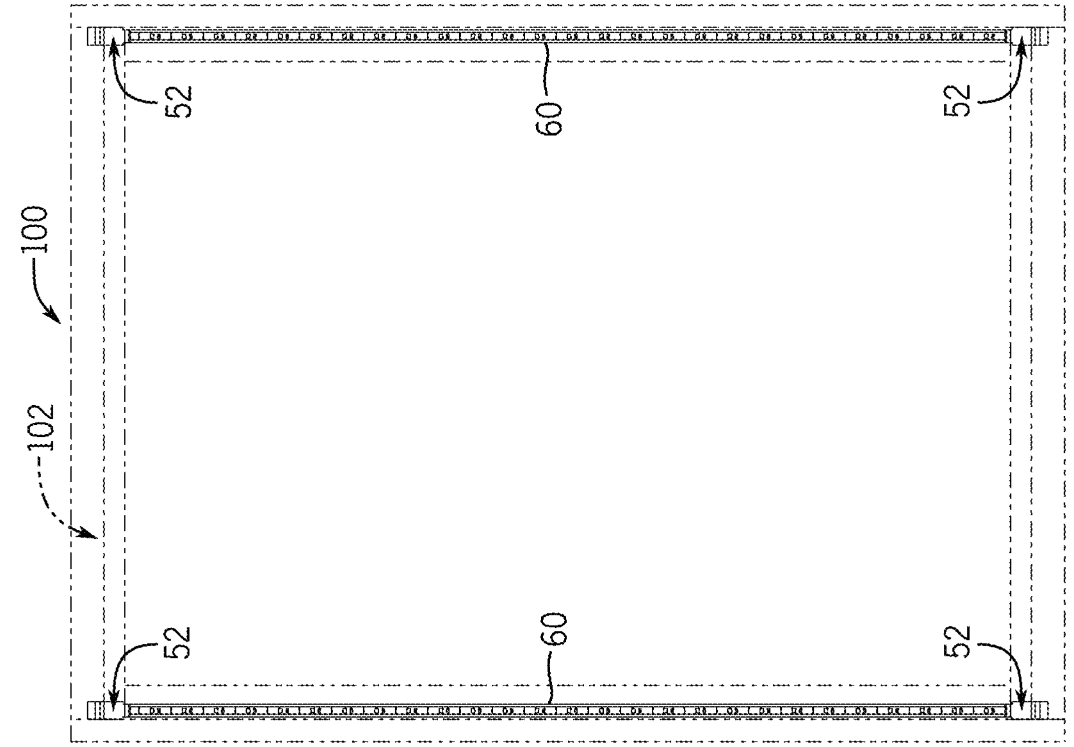

The arrangement of FIG. 15 is different. In this arrangement, the solution includes only over cabinet lighting and under cabinet lighting. A blank PCB strip or power pass strip 62 extends vertically along one side panel 108 of the cabinet interior to pass power for the two horizontal PCB lighting strips 60 via the corner connectors 52. The arrangement of FIG. 16 is similar to FIG. 14 but does not have an over cabinet lighting strip. The arrangement of FIG. 17 has only an under cabinet lighting strip 60. In this arrangement, a power pass PCB strip 62 (not shown) may be employed to deliver power from a top corner connector to a bottom corner connector 52, if desired. Alternatively, power may be delivered directly to the PCB strip 60 by a slide connector 80 slid onto the strip and connected to an LED driver 56 (not shown).

In the disclosed example, the controller or wireless receiver 72 of the LED driver or power supply 56 can be configured to provide intelligence to the system via a programmed or programmable processor. The controller 72 can be configured to control which of the zones are to receive power at any given time so that the lighting zones can be controlled independently. This controller function can instead be employed in the wireless controller 76 or in the driver 58 instead. In this example, however, the power lead 70 from the driver 56 can be coupled to the controller 72 and the lead 74 can terminate at the slide connector 80, which can be slid onto any one of the PCB strips 60, 62 of the system 50. In one example, a separate power lead 74 can be connected to one of the strips 60, 62 on each separate cabinet of an installation. These power leads 70 can be connected to a single controller 72 and LED driver and power supply 56. The single controller 72 may be connected to the LED driver or power supply 56 to controller the entire system. Multiple LED drivers or power supplies 56 may also be utilized in a single installation, if desired. A single controller 72 may be connected to the multiple drivers 56 or one or more of the drivers 56 may include a dedicated controller, with each controller being tied together to be controlled as one or simultaneously.

Figure 18:
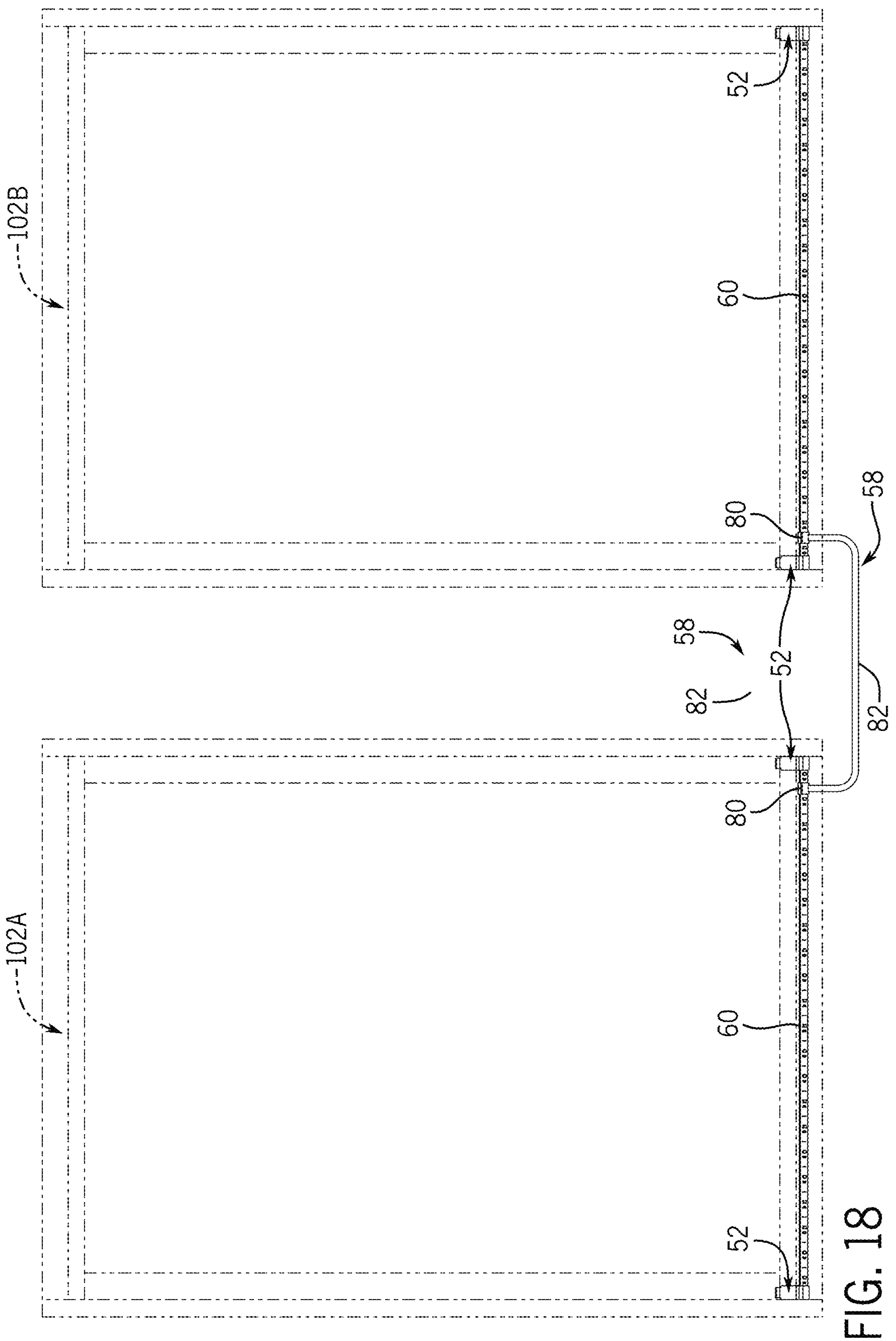

However, in another example as depicted in FIG. 18, multiple cabinets 102A, 102B can be linked to one another and one power lead 74 can provide power to multiple adjacent and linked cabinets. A link or jumper 58 can be utilized to connect a strip 60 or 62 on one cabinet to a strip 60 or 62 on another cabinet to link and connect the traces 86 of the adjacent cabinets 102A, 102B. The wire link or jumper 58 has a slide connector 80 on each end of the wire set 82. One driver 56, controller 72, and power lead 70, 74 and power connection for each cabinet can provide simplicity of troubleshooting and design. But that requires multiple such parts. However, when multiple cabinets are linked via jumpers 58, there may be an undesirable voltage drop across the system. Further, troubleshooting may be more difficult when there is a problem in the system. System complexity can also be increased. However, in some instances, a link or jumper cable 58 may be necessary or desirable between the PCB strips 60 or 62 on different cabinets. In such an arrangement, a first cabinet A can be connected to the LED driver 56 and controller or wireless receiver 72 and a second cabinet B can be linked in by the jumper 58 to get power and zone signals from cabinet A. The disclosed integrated lighting and power system can further accommodate both a linked cabinet configuration and a "hub and spoke" configuration where each cabinet has a single wire that runs back to the controller or wireless receiver 72. In a linked configuration, the wire link or jumper 58 has a slide connector 80 on both ends that can slide onto any strip 60 or 62 on the adjacent cabinets, as noted above.

Other cabinet, lighting, and power arrangements are also possible since the disclosed system is highly versatile. Also, one or more PCB light strips 60 can carry an illumination source or light element that is different from the other segments, as noted above. One or more of the PCB light strips 60 may have LEDs 88 that are low power and produce a warm Kelvin illumination. For example, the soffit accent lighting 36 of Zone 3 in FIG. 1 above the wall cabinets 26 does not need to be very bright while still providing a pleasant effect. The throw distance of such lighting may be limited but may be satisfactory to provide the desired accent lighting effect. Thus, warm Kelvin illumination may be utilized for the PCB light strips 60 over the cabinets of Zone 3 in the example of FIG. 1.

One or more of the PCB light strips 60 may have LEDs 88 that are slightly higher power and produce a cool white illumination. For example, the interior application of the solid door cabinets 40 and drawers 38, i.e., Zone 4 in FIG. 1, of the base cabinets 44 may require moderate illumination 37A, 37B and may be illuminated when a door or a drawer is opened. The intent is to provide utility light just when the door or drawer is open. In this instance, visual acuity may be more important than trying to match the other lighting in the room. Thus, a simple cool white LED 88 or illumination source may be used for the PCB light strips 60 of Zone 4 in the example of FIG. 1.

One or more of the PCB light strips 60 may have LEDs 88 that are still higher power and higher wattage. For example, the under cabinet lighting 24 of Zone 1 in FIG. 1 may generally be more oriented toward task lighting. Thus, one or more of the PCB light strips 60 could include higher wattage LEDs 88 or illumination elements. One may want the task lighting 24 to match the other lighting in the room. Thus, the LEDs 88 or illumination elements of the Zone 1 light strips may be provided and configured to produce warm white light.

One or more of the PCB light strips 60 may have LEDs 88 that are low or medium wattage but also produce a warm white light. For example, the interior cabinet lighting 28 of Zone 2 in FIG. 1 for the cabinets 30 with glass doors may be more for accent lighting. However, because the lighting is visible from within the room, even with the doors closed, one may prefer that the light more closely match the other room lighting. Thus, the LEDs 88 or illumination elements of the Zone 2 lighting strips 60 may be low or medium wattage at warm white.

In another example, as noted above, one of the channels or traces 86, or isolated traces 90, may be used to provide independent controllable power to operate other products or components instead of zoned lighting or lighting applications having another LED strip. For example, one channel of the PCB strips may be connected to a fan (not shown) that is mounted somewhere in the storage space or plugged into a slide accessory 150. The fan may be controlled by operating the prescribed channel. A wireless remote control unit 76 and/or a hand held remote control 78 (see FIG. 2) may be provided that can operate the controller or wireless receiver 72 and/or the LED driver 56 to control each of the multiple channels of the PCB light strips 60 separately. The remote control unit 76 and hand held remote control 78 can be used to turn all of the lights of a zone ON or OFF and to dim a zone. If another powered device, product, component, or accessory, such as a fan, is connected to one of the channels, the fan can be controlled using the remote. When the channel is turned ON, the fan will operate. When the channel is turned OFF, the fan will be turned off. When the dimming function of the channel is used, the fan speed may be controlled or controllable.

Other channels may be utilized in a similar fashion to control other powered devices, products, components, or accessories, such as speakers, timers, Bluetooth devices, chargers, or the like. Also, one or more channels of the powered light strip may go unused in any given installation, if desired. The solution can be used and varied to accommodate a wide variety of lighting systems and arrangements and cabinet systems and installations.

The PCB light strips, power pass strips, corner connectors, and other components can be installed on hidden surfaces of the cabinet system or installation. If desired, the cabinetry can be created having face frame surfaces, with or without recessed grooves, channels, or dados, along hidden surfaces of the cabinet components. However, it is very common to install light strips on flat surfaces of the cabinets. The PCB light strips can be routed and seated on these surfaces or in these grooves when installed. The PCB light strips and corner connectors can be pre-installed at the factory for the cabinets or can be installed at the installation site, if desired. The PCB light strips can be easily measured and cut to length to be attached to the cabinets at the factory or at the installation site.

In the completed cabinet system or installation, the face frame surfaces or the grooves, and thus the PCB light strips, can be positioned to illuminate the desired space, region, or area of the cabinetry. For example, some of the face frame surfaces or the grooves, and portions of the PCB light strips, can be outside of and exposed to the exterior of the cabinetry to illuminate spaces above or below various parts of the cabinet system or installation. Some of the face frame surfaces or the grooves, and thus portions of the PCB light strips, can be within and exposed to interior spaces of the cabinetry to illuminate such interior spaces of the cabinet system or installation.

Figure 20:
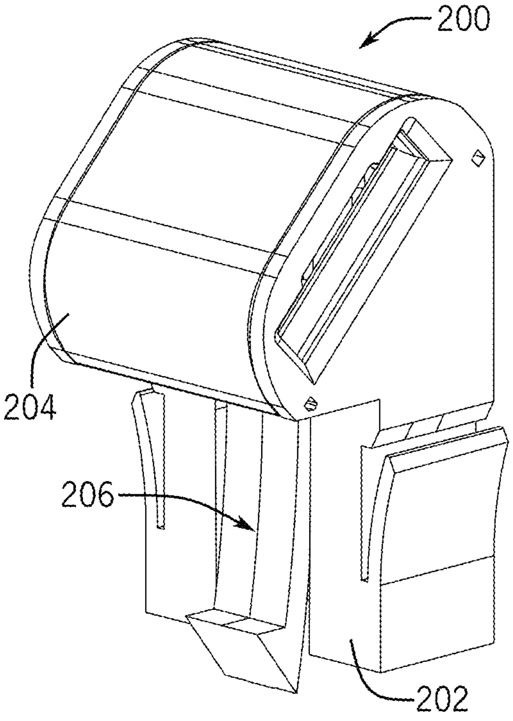
FIGS. 20 and 21 show front and side perspective views of another example of a connector for the integrated lighting and power systems disclosed herein, the connector constructed according to the teachings of the present disclosure.
Figure 21:
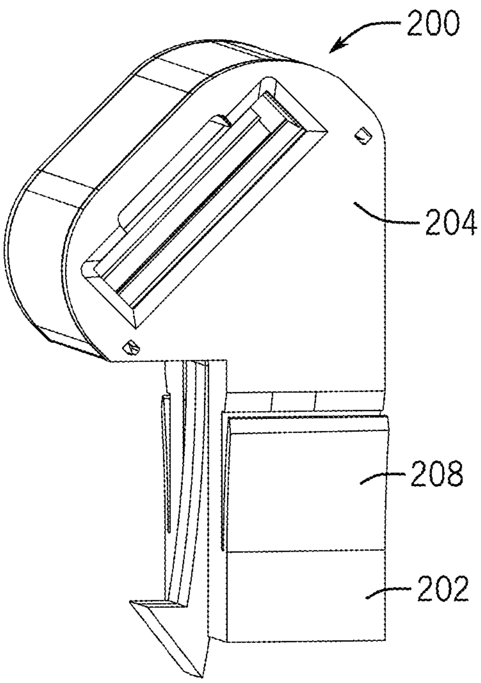

As noted above, the connectors or corner connectors can vary in construction, size, shape, and function. The angles and planes among the ports may be adjustable. The materials used to make the bodies can vary from the disclosed plastic material. The number and positioning of the contacts can vary. FIGS. 20 and 21 illustrate another example of a connector 200, modified from the connectors 52 described above. In this example, the connector 200 has a stem 202 and a head 204 defining the first and second ports, similar to the connector 52. The shapes and contours of the body are different in this example, with some surface features being rounded instead of rectangular or square cornered. A flex finger or curved latch stem 206 with a catch extends the length of the stem 202 in this example, replacing the protruding flex fingers and catches in the prior example. The latch stem 206 may provide more resiliency and require less force to install and may be more durable with more flex per length than the earlier example. The curvature of the latch stem 206 may also provide some positive pressure when installed to prevent movement or rattling of the connector 200 in the vertical and fore/aft directions when installed. Further, the stem includes opposed side shims 208 for the same purpose, preventing movement or rattling in the width direction.

The disclosed integrated lighting and power solution provides a simple, minimalistic lighting system. The disclosed system is easy to install, easy to manufacture, and easy to use. The disclosed system can be operated with a single remote configured to control multiple channels of a PCB. The disclosed system may include only a single power lead or multiple power leads. The system may require only a single connection to a power source or may utilize multiple connections to the power source. The system may also utilize only one controller with multiple connections to that controller or may utilize multiple controllers that may be controlled as one or separately. The disclosed system provides a lighting solution that offers tremendous design flexibility and functionality while utilizing only a very minimal number of very basic components.

The disclosed lighting and power system also has one or more a multi-channel strips that either pass power along the system, create light while providing multiple zone lighting capability, or both. The disclosed integrated lighting and power solution is capable of independent control of each separate zone along the various multi-channel strips (i.e., strips). The disclosed integrated lighting and power solution includes strips that may be formed having a relatively stiff structural form, so they remain straight or linear prior to and during use. Alternatively, the disclosed strips may have a substrate with some degree of flexibility. The disclosed strips can be blank or unchipped strips (with no lights), i.e., power strips, to simply pass power along the system or can include LEDs or chips configured to provide illumination. The light strips can be multi-channel PCB strips with single channel (monochrome) chips or multi-color chips. The light strip segments can thus each have a different type of light source and can be connected in series, where each segment provides a different lighting characteristic for a corresponding zone of a cabinet system. Alternatively, each light strip can have multi-color and multi-channel capability, where illumination is determined by the PCB structure of the strip and which channel is powered. The disclosed lighting and power solution is also configured to employ unique universal corner connectors that can connect adjacent strips of the system. The disclosed lighting and power solution is also configured to employ additional connectors that slide onto PCB strips to connect the strips to the power source and to the controller. The disclosed integrated lighting and power solution solves or improves upon one or more of the above-known and/or other problems and disadvantages with prior known cabinet lighting and power systems.

One existing lighting solution that offers independent zone control requires the use of digital LED strips, which are very expensive. Digital LED strips carry individually addressable diodes and thus multiple associated controllers. For each cabinet size, arrangement, etc., one would need to count how many diodes are on each digital LED strip length and program those specific chips to respond to commands as a group. Such a digital solution is also limited to using multiple, specific power level strips. In one example, kitchens have many cabinet size options and arrangements in one cabinet system or installation. The digital approach would be very expensive and not practical.

During fabrication of the cabinets or a cabinet system, or during installation at the installation site, it is only necessary to form the holes H for installing the connectors 52. The cabinetry does not otherwise need to be altered to accommodate the disclosed integrated light and power system.

If desired, fewer than all of the cabinets for a given cabinet system or installation may be provided with a lighting feature. Those cabinets without lighting may be installed with no PCB strips or corner connectors or may be provided with corner connectors, a jumper, and a power pass strip to jump power between cabinets and to otherwise bypass the unlit cabinets.

As noted above, the one or more power converters or LED drivers of the system may be plugged into a wall outlet or socket at the installation site. Alternatively, the power converters or LED drivers could instead be hard wired directly to the power source of the installation site, such as a traditional 120V AC system. The controller or wireless receiver and/or the LED driver or converter may include a multi-prong plug that plugs into the power source. In any case, the connection to the power source may be a switched connection.

In general, one example of a method of installing the disclosed integrated light and power solution or system includes installing the power cable, leads, controller or wireless receiver, and LED driver on one or more of the cabinets of the system at the factory, along with the PCB strips, the corner connectors, and the links or jumpers and slide connectors and slide accessories. Alternatively, some or all of the PCB strips and/or some or all of the corner connectors can be installed on each of the cabinets of the system or at least on the cabinets selected for illumination at the installation site or the factory, while the leads, driver, and controller are installed at the installation site. If desired, one or more powered devices, products, components, or accessories, such as the aforementioned fan, motion sensor, reed switch, etc. may be powered by the integrated light and power solution. Such components or accessories may also be installed on the cabinets at the factory or at the installation site. If the integrated lighting and power solution is pre-installed at the factory, the cabinets can then be shipped or delivered to a site for installation at the site. Any connections to power or among linked cabinets can then be made at the site, as needed. Alternatively, all or part of the integrated light and power solution can be installed on the cabinets at the installation site.

Some components or accessories may be more suitable for being installed and/or connected at the installation site. For example, a phone charger or charging system, a Bluetooth device, a Bluetooth speaker system, a tablet screen or display, or the like may be easily connected to a PCB strip of the integrated light and power solution or system after the cabinets are installed via use of a slide accessory. Other such components or accessories may be easier to mount or install at the factory, such as a fan or the like.

In the disclosed examples, the channels are defined by the conductors or traces 86 on the strips 60, 62. One of the traces is a positive voltage trace V+ and another is a negative voltage trace V−. The remaining traces can define the number of channels of the system. If there are only two or three traces, the system would be an always ON/OFF system or a single channel controllable system. With three traces, the system would be a one channel system. With four traces, the system would be a two channel system. With five traces, as in the illustrated examples, the system would have three channels, and so on.

In one example, each of the ports on the connectors can include a slot or groove along one of two opposed surfaces within the port. The grooves can be provided for clearance to allow insertion or partial insertion of a light strip whereby a chip or LED slides along the groove into the port. This permits even greater variance in how roughly or inaccurately the strips would need to be cut when installing a system.

The disclosed integrated lighting and power solution and system offers a modular, easy to install solution. The system can be relatively inexpensive regarding part cost, manufacturing cost, and installation and repair expense. The system allows easy field updates, repairs, and the like, when upgrades or repairs are desired for a cabinet installation. Each connector or corner piece features ports arranged to receive an end of a light strip or power strip to allow modular system installation and the strips and other components allow for linking of cabinets or home runs connecting the system back to the controller or wireless receiver.

The disclosed connectors and the system are unique in that the power can be attached anywhere along the system, to any cabinet, any light strip, and any location on the light strip. In the disclosed system, the controls do not need to be attached to the power, though they can be. Using the disclosed system, the power supply can be on one side of bank of connected cabinets, attached to a connected light strip. The controls that operate the system can be on the other side of the bank of connected cabinets and the controls can use the power and then pass it to the lights. No other lighting system, without a dedicated power bus, is able to function in this manner. Adding a power bus (such as with track lighting) add significant cost to a system. The cost is on the order of the cost of the lights. The brilliance of the disclosed system is that the lights and connectors effectively act as the bus.

In use, however impractical for a given lighting system, one could arrange the disclosed system to have two separately controllable zones of lighting using only a single connector. One light strip could be installed in the vertical port, i.e., the first port, and another light strip could be installed in one open end of the loop port, i.e., the second through port. Power and controls could be connected to one of the two light strips and manage those light strips independently. More practically, to install one zone of lights in a cabinet, the system would use two connectors, one to support each end of a light strip. To add an additional strip and optionally an additional zone, one end of the added strip could be installed in one of the first two connectors and another, third, connector would be included to support the other end of the additional strip. To then add another independently controlled zone, the system would then use a fourth connector. Adding the fourth connector to the cabinet adds the ability to add two more strips, one vertical strip and one horizontal strip. Effectively one could add one or two more zones. Four zones using four strips can be accomplished with six trace light strips including a positive trace, a negative trace, a channel 1 trace, a channel 2 trace, a channel 3 trace, and a channel 4 trace. The above disclosed examples are shown with 3 channels via the three active connected traces, plus the positive and negative traces. As should be evident to those having ordinary skill in the art, there does not need to be a one-to-one relationship between the number of connectors and illumination zones.

Further, the strips may have more than one set of illumination elements, which can be controlled via a single channel or which can be controlled via multiple channels independently. This will impact the aforementioned description regarding having one channel per light strip. As discussed briefly above as well, each light strip may instead have two or more different channels. In other words, a light strip in question may have some illumination elements connected to a first channel or trace and other illumination elements connected to a second channel or trace. The strip design can thus be set up where such a light strip could be controlled by two channels on the controller. A second strip with a single set of illumination elements could then use a third channel on the controller, and the like.

Although certain modular lighting and power systems, lighting systems, power delivery and control components, connectors, system components and accessories, and installation methods have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A cabinet system with integrated lighting and power, the cabinet system comprising:

a first illumination zone associated with a cabinet;

a first connector having a first port defining a first axis and having a second through port with open ends opposite one another and defining a second axis, wherein the first axis and second axis are arranged generally orthogonal to one another;

a first light strip having an elongate substrate with a first end, a second end, a plurality of illumination elements spaced apart along the substrate, and multiple traces extending lengthwise along the substrate, the multiple traces including a positive power trace, a negative power trace, a first trace connected to the plurality of illumination elements, and a second trace not connected to the plurality of illumination elements, the first end and the second end configured to be selectively received in any one of the first port or either of the open ends of the second through port of the first connector; and a driver coupled to a power source, the driver having a lead with a slide connector configured to slide onto the first light strip, wherein the illumination elements of the first light strip are selectively controlled by controlling power to the positive and negative power traces and the first trace to illuminate the first illumination zone.

2. The cabinet system of claim 1, wherein the elongate substrate of the first light strip is a printed circuit board (PCB) substrate that is substantially rigid.

3. The cabinet system of claim 1, further comprising a power pass strip having an elongate substrate with a first end, a second end, and multiple traces extending lengthwise along the substrate, the multiple traces including a positive power trace, a negative power trace, a first trace, and a second trace, and wherein the power pass strip is configured to pass power along the length of the power pass strip.

4. The cabinet system of claim 1, further comprising one or more additional connectors each having the same construction as the first connector.

5. The cabinet system of claim 4, wherein the first end and the second end of the first light strip are configured to be selectively received in any one of the first port or the opposite ends of the second through port.

6. The cabinet system of claim 1, wherein the first connector includes a stem part defining the first port and a head portion defining the second through port.

7. The cabinet system of claim 6, wherein the first port and the stem part are oriented defining a first plane that is parallel to the first axis, and wherein the head part and the second through port are oriented defining a second plane that is parallel to the second axis.

8. The cabinet system of claim 7, wherein the first plane and the second plane are neither perpendicular nor parallel with one another.

9. The cabinet system of claim 7, wherein the first plane and the second plane are oriented about 45 degrees relative to one another.

10. The cabinet system of claim 1, further comprising a wire link including a link slide connector at each end of a wire set, wherein each of the link slide connectors is configured to selectively slide onto the first light strip when mounted to the cabinet and configured to selectively slide onto a second light strip when mounted to an adjacent cabinet, with one of the link slide connectors being connected to each of the first and second light strips.

11. The cabinet system of claim 1, wherein the first port is a blind channel formed in a body of the first connector, and wherein the second through port is a through channel formed in the body of the first connector between the opposite ends of the second through port.

12. The cabinet system of claim 1, further comprising:

a second illumination zone; and a second light strip having an elongate substrate with a first end, a second end, a plurality of illumination elements spaced apart along the substrate, and multiple traces extending lengthwise along the substrate, the multiple traces including a positive power trace, a negative power trace, a first trace not connected to the plurality of illumination elements, and a second trace connected to the plurality of illumination elements, the first end configured to be selectively received in any one of the first port or the opposite ends of the second through port of the first connector not occupied by the first light strip and to be selectively received in any one of a first port or opposite ends of a second through port of a second connector having the same construction as the first connector, wherein the illumination elements of the second light strip are selectively controlled by controlling power to the positive power trace, the negative power trace, and the second trace to illuminate the second illumination zone.

13. The cabinet system of claim 12, wherein power from the power source is distributed from the slide connector to the first light strip, then to the second connector, and then to the second light strip.

* * * * *